United States Patent [19]

Keller et al.

[11] 3,930,120

[45] Dec. 30, 1975

[54] MULTI-BEAM CATHODE RAY TUBE HAVING EQUALIZED LINE BRIGHTNESS

[75] Inventors: Bruce W. Keller, Los Angeles; William C. Hoffman, Torrance; Elvin E. Herman, Pacific Palisades, all of Calif.

[73] Assignee: Hughes Aircraft Company, Los Angeles, Calif.

[22] Filed: Mar. 6, 1975

[21] Appl. No.: 555,774

Related U.S. Application Data

[63] Continuation-in-part of Ser. No. 431,200, Jan. 7, 1974, abandoned.

[52] U.S. Cl. .................................. 178/7.7; 178/6.8

[51] Int. Cl.[2] .......................................... H04N 5/19

[58] Field of Search ............ 178/7.1, 7.5 D, 7.7, 6.8

[56] References Cited

UNITED STATES PATENTS

| | | | |
|---|---|---|---|
| 2,058,883 | 10/1936 | Ives | 178/7.1 |
| 2,220,688 | 11/1940 | Schröter | 178/7.5 D |
| 3,829,613 | 8/1974 | Melchior | 178/6.8 |

*Primary Examiner*—Howard W. Britton
*Attorney, Agent, or Firm*—W. H. MacAllister; Rafael A. Cardenas

[57] ABSTRACT

A system for producing a raster display having uniform line brightness is disclosed which is especially suitable for multi-beam cathode ray tubes. A multi-beam or multi-gun cathode ray tube having N beams for painting N lines at a time to develop a first raster beginning at a first display line position. Subsequent rasters are developed by painting the same N number of lines at a time with a first line of that raster being scanned at a line position that is displaced between 1 and N-1 lines from the first line position painted in the preceding raster. The parallel input sources to the N beam is multiplexed for maintaining the video display at the proper position. That is, a line of input data is always presented on its corresponding display line position on the screen during successive rasters. By shifting the beams in each subsequent raster and by correspondingly switching (multiplexing) the input video data to the appropriate beams for each subsequent raster, the display appears to the eye to have a substantially uniform average line brightness. The invention herein described was made in the course of or under contract or subcontract thereunder (or grant) with the Department of the Navy.

9 Claims, 18 Drawing Figures

MULTI-BEAM CATHODE RAY TUBE HAVING EQUALIZED LINE BRIGHTNESS

CROSS REFERENCE TO A RELATED APPLICATION

This application is a continuation-in-part of a copending U.S. patent application, Ser. No. 431,200 for Multi-Beam Cathode Ray Tube Having Equalized Line Brightness; filed Jan. 7, 1974, now abandoned.

FIELD OF THE INVENTION

This invention generally relates to display systems and in particular to a television or other raster display system utilizing, for example, a multi-beam cathode ray tube for providing all display lines with a time-averaged brightness transfer function over the tube life and for providing a high quality and high resolution video image.

DESCRIPTION OF THE PRIOR ART

Television or other raster type display systems utilizing multi-beam CRTs and operating under conventional scanning methods are generally unable to develop a high quality raster display due primarily to the variation of the brightness transfer function from beam-to-beam instantaneously and as a function of age. These variations give rise to line striations on the display. It is also difficult to achieve and maintain uniform input-output transfer functions for the individual video driver amplifiers and gamma correctors coupled to each CRT beam.

Multi-beam (including multi-gun) cathode ray tubes (CRTs) are well known in the art and have been used for generation of both color and black and white television displays. Some multi-beam CRTs utilize the plurality of electron beams to develop a raster display in a paintbrush like fashion which refers to the simultaneous tracing of a set of adjacent lines on the screen by a plurality of beams. For purposes of discussion here it is assumed that a CRT has four electron beams and field interlacing is not used. As a particular illustrative case, a four beam CRT scans four lines at a time with the first beam scanning a first line at the first line position on the screen and the fourth beam scanning a fourth line at the fourth line position with the second and third beams scanning their respective positions on the CRT screen. The four beams are simultaneously deflected four line positions downward in the Y dimension for scanning a second set of lines. The first beam now scans a line at the fifth line position while the fourth beam scans a line at the eighth line position. The process of scanning and deflecting continues until the four beams paint a predetermined number of lines required for a full raster display.

Multi-beam cathode ray tubes have also been utilized in display systems using the interlace techniques.

In most multi-beam and multi-gun CRTs each beam with its associated driver amplifier has a different brightness transfer function and the transfer function varies with tube age due to a degradation of the electron gun cathode material and the driving and control circuits of the individual beams. The beam current varies in a decreasing manner with tube age and use which results in a degradation of line brightness thereby reguiring bias readjustment. More particularly since all electron beams do not uniformly degrade, line striations result in the CRT display in accordance with the individual electron beam and driver circuit differences. To compensate for this variation of brightness transfer function and beam currents, frequent adjustments are made to the video amplifier and the brightness control circuitry. Each CRT grid driving video amplifier generally includes some form of gamma correction to compensate for non-linearity in each CRT's grid input drive-versus-electron-beam current transfer characteristic. The same shape transfer characteristic is difficult to achieve between CRT beams. This too gives rise to striations in non-uniform screen brightness for uniform video level input.

SUMMARY OF THE INVENTION

Accordingly, it is the object of the present invention to provide a reliable, high quality raster display system.

It is another object of the present invention to provide a raster display system wherein thru averaging, each display line has an equal resultant brightness transfer function.

It is still another object of the present invention to provide a multiple beam cathode ray tube display requiring little or no adjustment to compensate for the differences and in the individual beam currents and transconductance.

In accordance with the foregoing objects, a raster type display system includes a multi-beam display device video input circuits and control circuits. The multi-beam device generates N beams for simultaneously tracing a set of N lines at a time. The multiple beams form a complete raster by tracing a predetermined number of sets of lines, each set containing N lines. Subsequent rasters are created by displacing the N beams at least one line position from the preceding raster. As the beams are deflected to commence a succeeding raster, a beam switching unit provides the multiplexing required to present the video data during each raster at the proper respective line positions on the display screen. The video switching or multiplexing and beam deflection provided the eye with a raster display that has a substantially uniform line brightness through the process of averaging over two or more rasters.

DETAILED DESCRIPTION OF THE DRAWINGS

Figure 1:
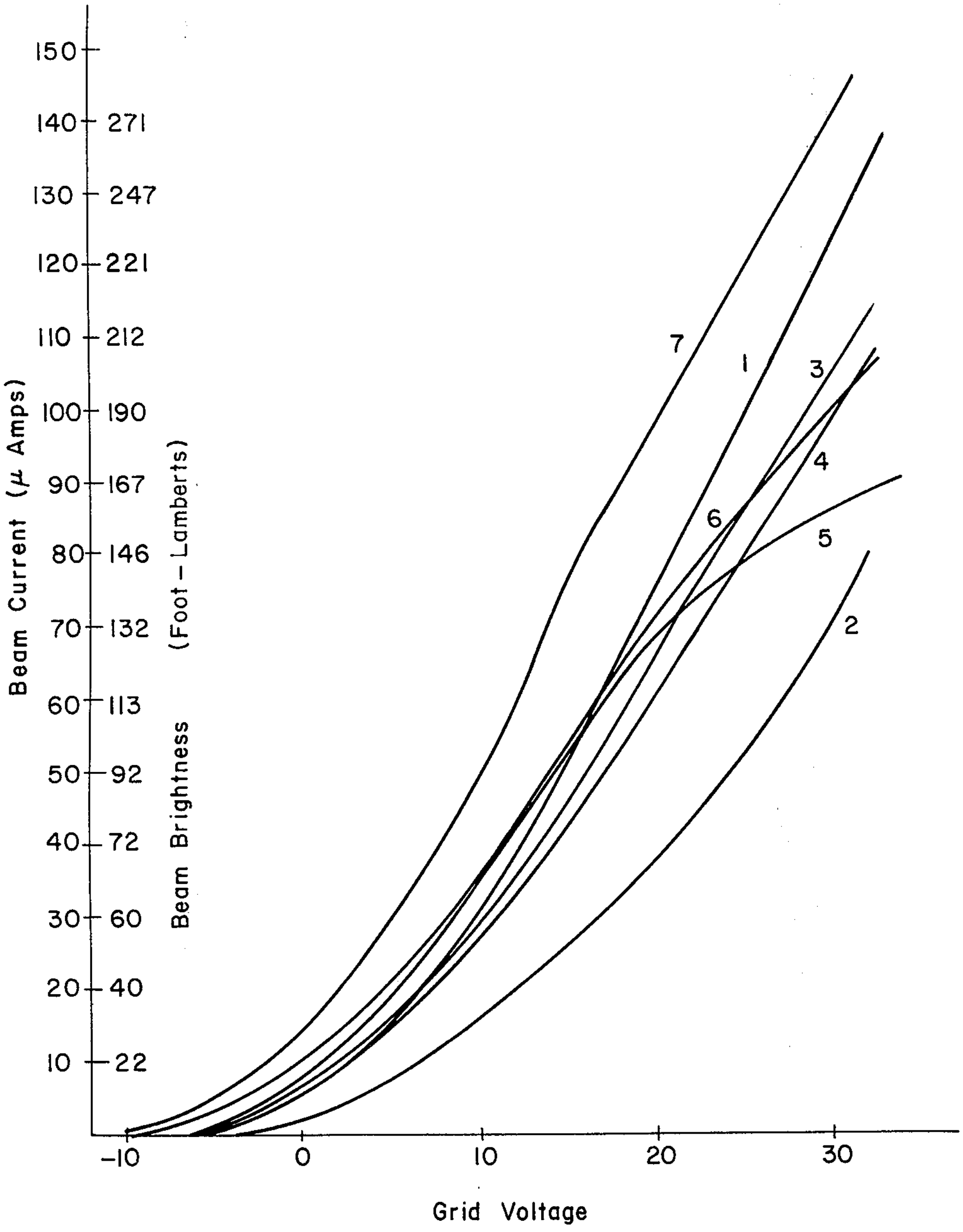
FIG. 1 is a graph representative of the brightness versus grid voltage of the individual beams in a 7 beam cathode ray tube.

Referring more specifically to FIG. 1, a graph of beam current in microamperes and beam brightness in foot-lamberts versus grid voltage has been plotted from tests conducted on a commercially available 17 inch, 7-beam cathode ray tube.

Since the brightness of a display line on a screen is directly proportional to the beam current both the beam current in microamperes and the brightness in foot-lamberts use the same axis, i.e. the ordinate axis. The grid voltage is plotted on the abscissa. The brightness of a display line is measured by a photometer viewing the screen and beam current is measured in the high voltage circuit.

The CRT used for obtaining the curve plotted in FIG. 1 included the electrodes normally used in a typical CRT. These electrodes include the heater, the cathode, three beam forming and shaping electrodes, an electrostatic focus control, control grids for each beam, an alignment coil, a focus coil and a deflection coil. To perform the experiment only one beam at a time was displayed on the screen while the other beams were biased at cutoff. Each beam in turn was made to scan the screen and trace a series of lines thereon. The control grid electrodes for six of the seven beams were biased at −30 volts, i.e., cutoff, while the seventh control grid was coupled to a variable voltage power supply for developing beams of varying intensity. The remaining electrodes were each coupled to the proper power sources to operate the CRT in an otherwise normal manner.

The graph lines 1 through 7 represent the grid transfer functions of the beam 1 through 7, respectively. It is noted that the transfer curves 1, 3, 4, 5 and 6 are grouped reasonably close while curves 2 and 7 diverge from the main grouping of curves. Notice also that at 0 volts grid voltage there is a wide variation between curves 2 and 7. It can be seen that the curve 7 has 30 foot-lamberts at 0 volts while curve 2 has only 5 foot-lamberts at that voltage. The present invention is directed at preventing the effective line brightness transfer functions from exhibiting such a vast variation.

Figure 2A:
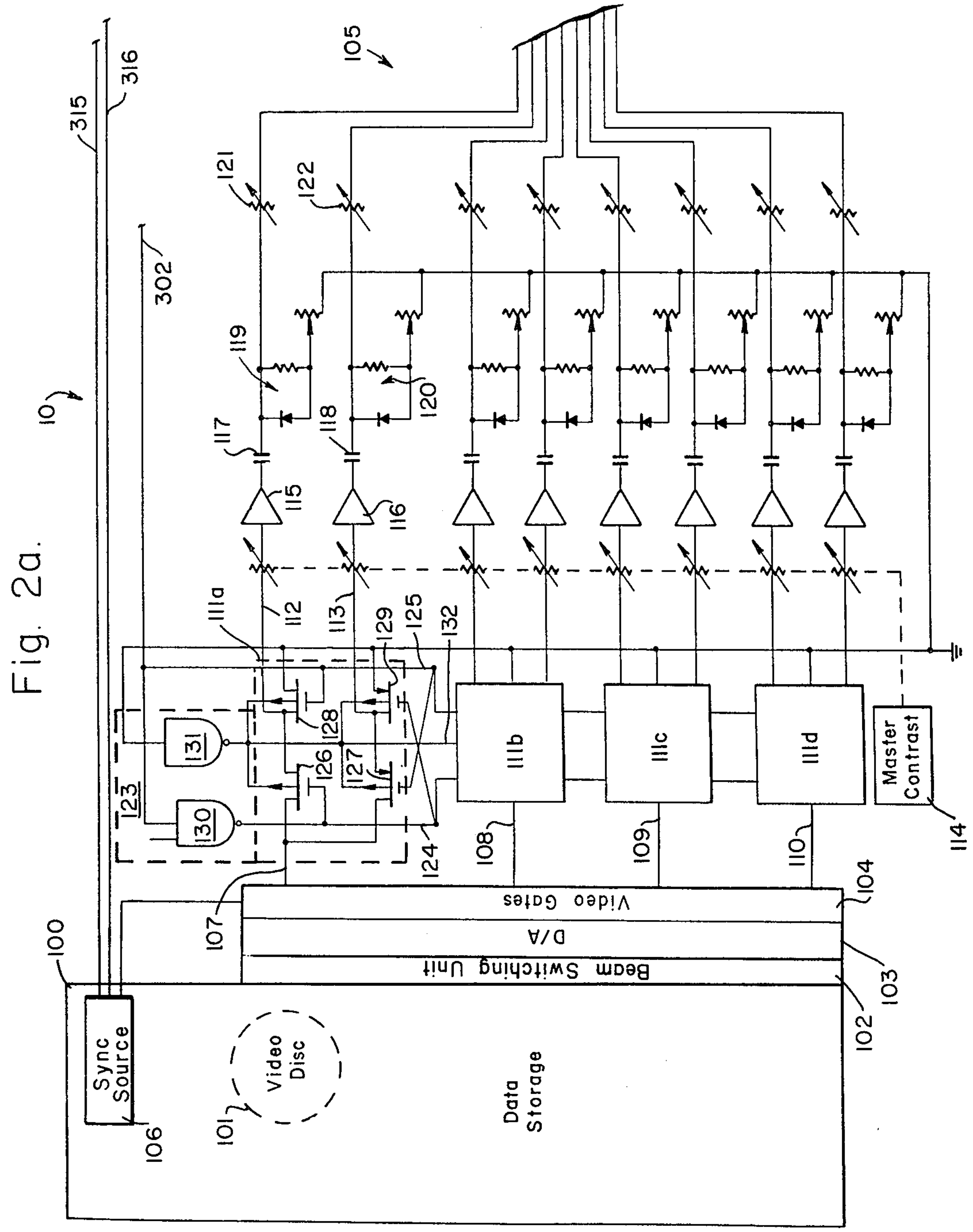
FIGS. 2*a* and 2*b* are schematic block and circuit diagrams depicting an 8 beam display system in accordance with the principles of the invention.
Figure 2B:
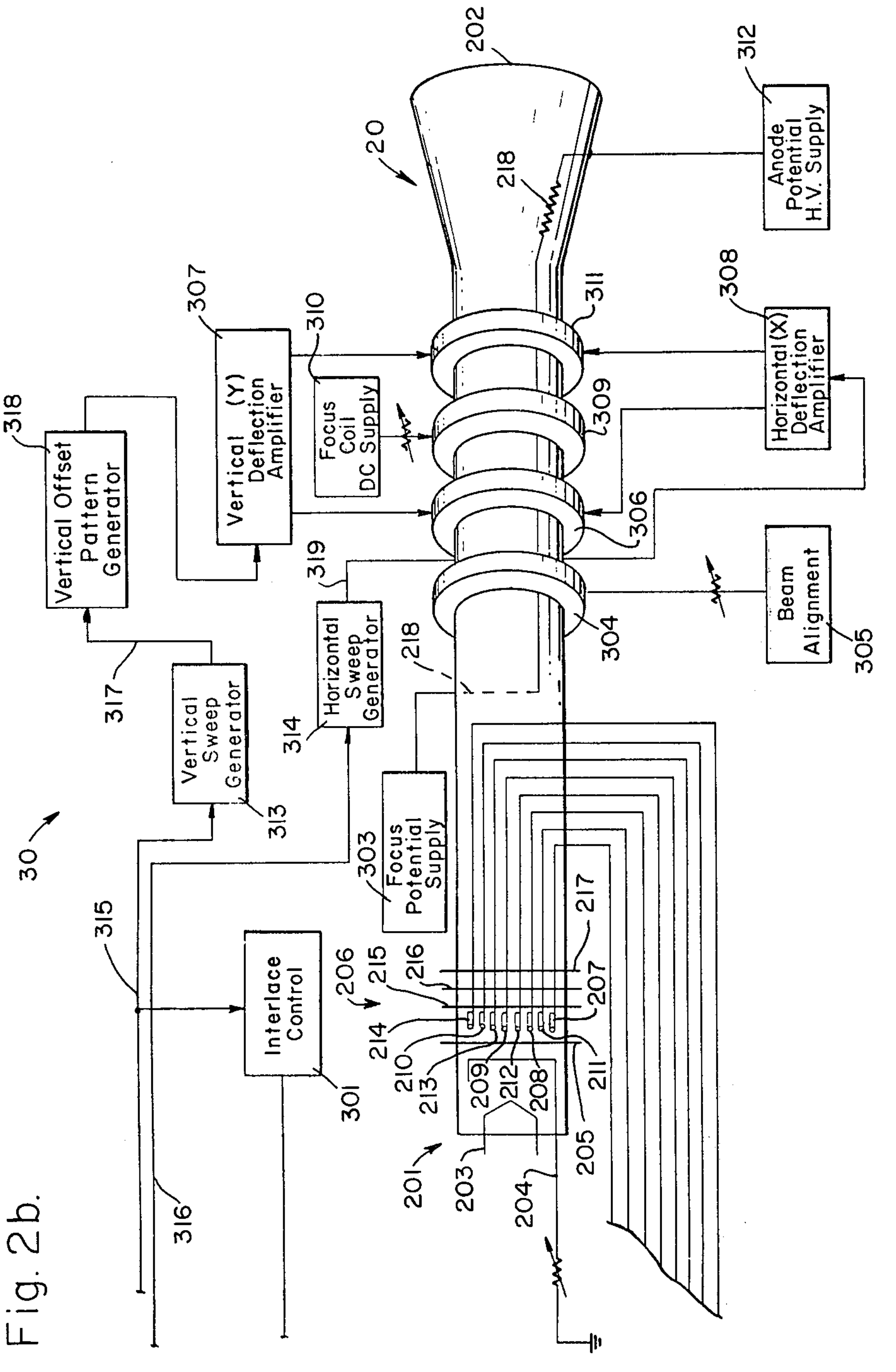

Referring now to FIGS. 2*a* and 2*b*, a multiple beam CRT is depicted for simultaneously generating a plurality of horizontal lines on a display. According to the present invention a television or raster display system includes a source of video signals 10, a multiple-beam cathode ray tube 20 and CRT deflector and control circuitry 30. The source of video signals 10 may be seen to include a data storage unit 100, a video disc 101, a beam switching unit 102, a digital to analog (D/A) converter 103, video gates 104, for controlling the amplitude of the electron beams from an electron gun in the CRT 20, and input circuits 105 to the CRT 20. The D/A converter 103, video gates 104 and input circuit 105 are each comprised of one channel per electron beam. Although FIG. 2 depicts an eight beam CRT 20, only four beams are utilized or activated at a time for painting a single field of a two-field raster or frame. Therefore, only four channels are required at any time.

The data storage unit 100 which, for example, may have a video disc 101 or any other suitable arrangement such as a magnetic drum, a tape unit, a core memory, a memory using circuits capable of storage of other types of parallel channel memory for either analog or digital data storage. A video disc 101 may be a 5200 series parallel disc memory by Data Disc Incorporated. The data may be provided to the data storage source 100 by a data source such as a vidicon camera for obtaining data from a chart or scene. A synchronizing unit or source 106 may be provided in the data storage unit 100 for timing control. The beam switching logic 102 provides the digital data read-out in the proper sequence, i.e. it selects the proper data from the video disc 101 for practicing the principles of the invention. The beam switching logic 102 supplies signals to the D/A converter 103 and then to the video gates unit 104 (See FIG. 4 for a detailed discussion of the beam switching logic circuitry.) When the data storage unit 100 stores digital information a digital to analog (D/A) converter unit 103 must be used to supply analog data to the video gates 104 controlled from the synchronizing unit 106. A converter such as ILC Data Device Corporation, 13 Bit Hybrid D/A Model SDAC may be used for the D to A converter 103. Instead of providing stored data to the display device the parallel inputs to the beam switching unit 102 can be supplied from a parallel output sensor having scan rates compatible with that of the display, for example, an infrared sensor having multiple IR detectors providing parallel and simultaneous outputs.

The video gates unit 104 provides four parallel channels to the video input circuit 105 for controlling the beams in a multi-beam CRT. The first channel of the video gates unit 104 supplies a signal to an interlace switch 111A through a lead 107. The switch 111A in response to the switch control circuit 123, for interlacing, in turn supplies a signals to a suitable master contrast circuit 114 alternatively through leads 112 or 113. The master contrast circuit 114 provides signals to the video amplifiers 115 or 116 alternatively.

The video amplifiers 115 and 116 are followed in turn by ac coupling capacitors 117 and 118, dc restoration and brightness balancing controls 119 and 120, and contrast balancing controls 121 and 122, respectively. The second, third and fourth channels of the video input circuit 105 are connected to the video gates unit 104 by leads 108, 109 and 110, respectively. The four channels are similar and therefore the second, third and fourth channels will not be discussed in detail.

If an 8 beam interlace scheme is not employed the four interlace switches 111*a*, *b*, *c*, and *d* are not required. Instead lines 107, 108, 109 and 110 may be coupled directly to the four corresponding inputs to the master contrast circuits 114.

In this illustrative example, since four lines are painted simultaneously, the total number of horizontal deflections required to complete a raster is one-fourth that of a single beam CRT. Hence the line deflection rate can be four times slower. Because of this, along with the use of four parallel video channels, each of the video amplifiers in the multi-beam arrangement of the invention, require a bandwidth of only one fourth for the same picture resolution that is required for operation with a single beam since each individual beam is now handling only one fourth of the data output to the entire viewing area.

The beam switching unit 102, as mentioned above, provides the proper read-out sequence of stored data from the video disc 101 for presentation on a CRT screen. In its most simplified form the beam switching unit 102 reads out four lines of stored data at a time from the video disc 101. In the video 101 the data is normally stored so that the first line of stored data is read out by a first channel. Assuming a non-interlaced display technique, the second, third and fourth lines of stored data are generally read out on the second, third and fourth channels. Thus the first four lines of stored data are read out simultaneously for simultaneously presentation on a display screen. The next four lines of stored data are then read out, followed by the next four, etc., etc., until all the lines of the stored data have been read out to paint a raster. In other words, all the lines of stored data are read out, four-at-a-time, for painting a raster on a screen. Generally, in the prior art, when all the data necessary to form a complete raster is read out of the data storage soure, the readout process begins again at the first line of data storage.

According to the present invention, however, the beam switching logic provides the read-out for a second frame commencing, for example, at a line of stored data other than the first line. For example, the read-out may start at the second through fifth data lines, inclusive, and continue four lines at a time until all the data for a second frame is completely read out. The third frame may commence at the third through the sixth lines of stored data, inclusive, and continue reading out four lines of stored data at a time. The fourth frame may start by reading out the fourth through seventh lines, inclusive, until all the lines necessary for a complete raster have been read out and displayed on a screen. For the fifth readout the first through the fourth lines of stored data are read out by the four channels. The beam switching unit 102 is utilized to maintain the image being displayed on a screen in its proper position. That is, a line of stored data is always written on its corresponding display line position on the screen.

As will be further developed below, the system according to the present invention provides the eye with a display having lines with a constant average brightness, only varying in accordance with the video input imagery, instead of lines that vary due to differences and variation in the brightness transfer function associated with each beam. For example, if the fourth beam in a four beam CRT has a relatively small current density causing the line that it scans or traces to lack brightness, then every fourth line that is traced on the display using the conventional method of four beam scanning would appear to be relatively dim. If, however, the device according to the present invention is used, the fourth beam would display the fourth line of stored data only once every fourth raster and that line would be displayed by the other three during the other three reaster. The time averaging effect on brightness of presenting the data successively with four beams results in minimizing the dark line or striation that would otherwise occur every fourth line does. In other words since each display line has the data written successively with all four beams, there will be far less display brightness variation due to the different beam transfer functions and what does remain is not spatially localized every four lines but instead appear as a minor overall brightness flicker.

A more detailed description of the circuit for providing the read-out function of the present invention is found below in FIG. 4. Since the data rate required for a display line cannot normally be accommodated on a single track line of data storage on the video disc, the data must therefore be stored on several tracks. A multiplexer unit (not shown) may be utilized for reading out several lines of stored data from the video disc 101 in the proper sequence to make up a line of display data. The operation of multiplexers is commonly known in the art and will be discussed here. A multiplexer such as National Semiconductor Model Numbers DM 7121 or DM 8121 eight channel digital multiplexer may be used.

Switches 111a–111D FIG. 2*a* are utilized for presenting an interlaced display and although only the switch 111*a* has been depicted in detail, switches 111*b*, *c*, and *d* and their corresponding circuitry, respectively, are substantially similar to the switch 111A and its associated circuitry. For interlacing of the beam scanning function with an alternate set of beams, a switch control circuit 123 is responsive to the field interlace control circuit 301 (FIG. 2g) via lead 302 to alternatively energize either lead 124 or 125 to connect the input lead 107 through a field effect transistor 126 to the lead 112 or to connect the lead 107 through a field effect transistor 127 to the lead 113. A logical true signal on the lead 302 from the interlace control 301 provides a low voltage on the base of the field effect transistor 126, biasing that transistor into conduction and connecting the lead 107 to the lead 112 and provides a high voltage on the base of the field effect transistor 128, biasing that transistor out of conduction. The field effect transistor is biased into conduction and the transistor 128 is biased out of conduction so that the field effect transistors 127 and 129 are biased out of and into conduction, respectively. A logical false signal on the lead 302 provides a low voltage on the base of the field effect transistor 127 to bias that transistor into conduction and provide a high signal on the base of the transistor 129 to bias that transistor out of conduction. The signal on the lead 107 is thus applied through the transistor 127 to the lead 113. In the illustrated arrangement, the logical true and false signals on lead 302 may be +5.0 volts and 0 volts, respectively. An inverter 130 is thus provided between the lead 302 and the lead 124 to provide this conventional switching operation. An inverter 131 is provided to decrease the effect of drift and aging and applies a reference voltage to a lead 132 to control the substrate bias of the transistors.

See FIG. 6 below for a description of another embodiment of the present invention wherein a single set of electron beams is used either for non-interlaced rasters or for interlacing purposes.

The multi-beam CRT 20 of FIG. 2*b* includes an electron gun section 201 for emitting a plurality of electron beams for painting a picture or display on the phosphor screen 202. The electron gun 201 may have any of several configurations, such as for example a plurality of cathodes or a singular large cathode having a multi-apertured structure for forming electron beams. Other schemes may be utilized for forming individual electron beams within the scope of the present invention.

The electron gun 201 depicted in FIG. 2*b* includes a heater electrode 203, a cathode electrode 204 having a suitably large area, a baffle 205 having an array of holes that correspond to the required number of beams that are to be formed. The baffle 205 is operated a few volts positive relative to the cathode 204 for forming the individual electron beams. Baffle 205 is followed by a control or matrix grid 206 for the electron beams passing through the grid openings 207–214. The grid 206 is an insulated flat plate pierced with an array of apertures registered with those in the baffle 205. The inner surfaces of the holes in the matrix grid 206 are plated with conductors 207–214, which serve as control grids. The first group of control grids 207–210 control the electron beams which trace a first set of alternate lines i.e., one frame of a 2-field interlace on a display screen 202. The second group of grids 211–214 control the electron beams which on the second field trace a second set of alternate lines that are interlaced with the first set. The conductors i.e., control grids 207–214 are coupled to the four output channels from the video gates 104. The beam control grids 207–214 are connected in pairs to the switches 111A–111D, respectively. Grids 207 and 211 are connected to the switch 111A; grids 208 and 212 are connected to the switch 111B; grids 209 and 213 are connected to the switch 111C; and grids 210 and 214 are connected to the switch 111D. Either group of grids may be gated on or off by the switches 111*a*–111*d*. For example, in the system shown, a ground potential applied to the conductors 207–210 will bias the control grids in the ground level or black video level.

Consider for the moment electron beam control grids 207–210 are the only source of electron beams for creating a single field raster. The first control grid aperture 207 is oriented such that the electron beam 207B passing therethrough traces a first horizontal line across the screen 202. The second control grid aperture 208 is oriented such that the electron beam 208*b* passing therethrough traces a line across the screen 202 that is immediately adjacent to the first line traced by the first beam 207*b*. The third control grid aperture 209 is oriented such that electron beam 209*b* passing therethrough traces a line across screen 202 that is immediately adjacent to the second line that is traced by the second beam 208*b*. The fourth beam 210*b* formed by the fourth control grid aperture 210 traces a line on the screen 202 that is immediately adjacent to the third line that is traced by the third beam 209*b*. The group of control grids 207–210 may be used alone, without control grids 211–214 for painting a video display on the screen 202.

If an interlaced scheme is used for painting a raster or frame, the second set of beam control grids 211–214 may be used in conjunction with the first group of grids 207–210. The first group of grids 207–210 controls the electron beam which paint the first field of a frame and the second group of grids 211–214 controls the electron beams which paint the second field of that frame or raster.

Electrodes 215, 216 and 217 may be provided after the matrix grid 206 in the direction of beam travel for beam forming and shaping. The electrodes 215, 216 and 217 each contain apertures of geometry similar to the baffle and matrix grid electrodes for providing further acceleration of the electron beams.

The electrons from the electron gun 201 are then passed through a focus electrode 218 controlled by a focus potential supply 303 and a beam alignment coil 304, normally situated close to the cathode, controlled by a suitable beam alignment power supply 305. The beam alignment coil 304 is followed by a dynamic focus coil 306 responding to signals from a vertical deflection or Y amplifier 307 and a horizontal or X deflection amplifier 308 to correct for the flatness in the configuration of the screen 202. The electron beams are then passed to a static focus coil 309 controlled by a focus coil DC supply 310. For purposes of illustration, the dynamic focus coil 306 and the static focus coil 309 are shown as being on separate cores. Normally a dynamic focus coil and a static focus coil are wound on the same core. The static focus coil 309 is followed by the deflection yoke or coil 311 having windings responding to the X and Y deflection voltages of the horizontal deflection amplifier 308 and the vertical deflection amplifier 307 respectively. The deflection yoke 311 deflects the plurality of beams passing therethrough by the same amount using the same voltage input. In other words the beams are simultaneously scanned across the screen in a first dimension and simultaneously deflected in a second dimension by the same voltages. Cathode ray tube 20 may also include a post deflection accelerator 218 which is controlled by a high voltage anode potential supply 312 that is referenced to the focus potential supply 303.

The vertical sweep generator 313 and the horizontal sweep generator 314 are coupled to the synchronizing source 106 in the data storage unit 100 through leads 315 and 316, respectively. The field interlace control 301 is coupled to both the synchronizing source 106 and the vertical sweep generator 313. The interlace control receives the vertical synchronizing signal on the lead 315 to control the interlace switching. The vertical sweep generator 313 applies a suitable slow Y sweep voltage through the lead 317 to the vertical offset pattern generator 318 and then to the vertical deflection amplifier 307 for controlling the vertical deflection of the plurality of beams through the dynamic focus coil 306 and the deflection yoke 311. The horizontal generator 314 applies a relatively fast X sweep voltage through a lead 319 to the horizontal deflection amplifier 308 for controlling the horizontal deflection of the beams.

The 8 beam interlace technique is disclosed to show one one possibility of practicing the invention. It may be preferable to utilize a A-beam interface scheme wherein all four beams each trace a line of video during each horizontal scan.

Figure 3:
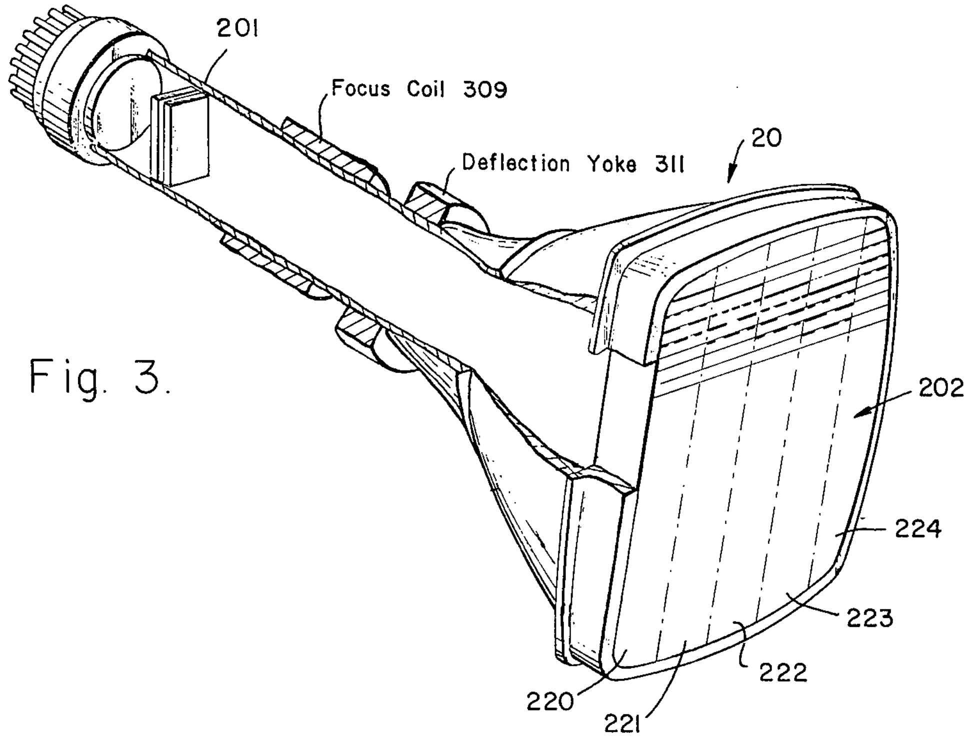
FIG. 3 is a perspective drawing showing a typical multi-beam cathode ray tube that may be utilized in the system of FIGS. 2*a* and 2*b* which further illustrates the principles of the present invention.

Referring briefly to FIG. 3, a perspective view of a CRT 20 is illustrated. The multi-beam CRT 20, herein shown, includes an electron gun 201, a focus coil 309, a deflection yoke 311, and a screen 202. For purposes of illustration, screen 202 has been divided into five vertically oriented selections for illustrating the use of the scanning technique without interlacing. The light lines on the display surface represent the position of the various display lines, wherein the vertical separation between adjacent lines has been exaggerated for purposes of illustration. The heavier lines overlaying the thin lines are representative of a line of data being displayed on a screen. The line of data that is displayed by an individual beam is further differentiated from the display lines traced by other beams merely for purposes of discussion and the display lines do not illustrate any particular data content. The solid line depicts the scan accomplished by beam 1. The short dashed line depicts the scan accomplished by beam 2, the long dashed line depicts the scan accomplished by beam 3, the alternate short and long dashed line depicts the scan accomplished by beam 4.

Each vertical sections 220–224 represents a small sector of an entire raster. The vertical section 220 represents a portion of a complete first raster that has been painted on the screen by the four electron beams. The section 221 represents but a portion of the second raster that was painted on the display screen 202 subsequent in time to painting of the first raster. The third section 222 represents a small sector of a raster painted on the entire screen subsequent in time to the second raster. The fourth section 223 also represents a small portion of an entire raster painted across the screen at a time subsequent to painting of the third raster. The fifth section 224 represents a small portion of a raster painted on the entire screen subsequent to painting of the above-mentioned fourth raster. It is noted that this fifth raster commences with data being painted at a first line position on the screen similar to that described in section 220. It is emphasized that although sections 220–224 are illustrated as being adjacent in position to one another, they are actually illustrative of small portions of entire rasters painted on the display screen as a function of time. In other words, the entire raster represented in section 220 was painted before the raster represented in section 221, etc., etc.

The operation of the invention according to FIGS. 2*a* and 2*b* may be described with reference to such figures, and to FIG. 3 and interlacing will not now be considered. The data storage unit 100 provides 4 channels of digital signals to the beam switching logic 102. The beam switching logic 102 provides the read-out of the first set of four lines stored data for presentation on the first set of four line positions on the display screen 202. The digital signals from the beam switching logic 102 are in turn supplied to the digital-to-analog converter 103. The converter 103 supplies the analog signals to the video gates unit 104. The analog signals are then provided by the four channels of the video gates 104 to the switches 111A–111D. With a logical true signal on the lead 302 from the interlace control unit 301, switch 111*a* will have an output to the amplifier 115 on the lead 112. Similarly, switches 111*b*–111*d* will have outputs on their respective leads corresponding to the lead 112 of switch 111*a*. The signal is amplified by the amplifier 115 and the brightness and contrast controls may be used for obtaining a suitably intense electron beam. The signal on line 112 is applied to the beam control grid 207 for modulating the electron beam 207*b* passing therethrough for painting a display line. Similarly, control grids 208, 209 and 210 are simultaneously modulated by their respective leads for painting display lines. The beam alignment coil 304 positions the beams at the center of the focus coils. The dynamic focus coil 306 and the static focus coil 309 each control the shape of the beam and the spot size on the screen 202. The deflection yoke and the control circuits for that yoke provide the horizontal scanning of the individual electron beams and the vertical deflection of these electron beams. All the data stored on the video disc 101 is read out and displayed four lines at a time.

At the end of the presentation of the first frame of data, the beam switching logic 102 then provides the read-out of the second through fifth lines of stored data first. The vertical offset pattern generator 318 supplies a signal to the deflection amplifier to deflect the four beams one step or line position down so that the second through fifth lines of stored data are presented on the second through fifth line positions on the display 202. The remainder of the stored data is read out four lines at a time and likewise presented on the screen. At the end of the second frame, the beam switching logic 102 provides the read-out of the third through sixth lines of stored data and then reads the following lines of stored data in the paintbrush like fashion to form the third frame. The vertical offset pattern generator provides the vertical deflection amplifier with an offset signal. The fourth frame commences as the beam switching logic 102 reads out the fourth through seventh lines of stored data for presentation on the fourth through seventh display line positions. The fifth frame commences as the beam switching logic 102 reads out the first through fourth lines of stored data similar to the first frame.

It should be noted that the invention is not limited to the one step at a time down deflection of the data read out and beam deflection. Any other scheme may be equally utilized such as, for example, two lines down for the second frame, then one line up for the third frame, then two lines down for the fourth frame, and then return to the first line for the fifth frame.

It is also noted that as the beams are deflected downward at the commencement of the second, third and fourth frames, the lines at the top and bottom of the display screen 202 may appear to flicker. To compensate for this, flicker circuitry (not shown) or optical masking may be provided to blank out the top and bottom three lines and thereby prevent lines which are not printed on every raster from being observable.

Referring now to tables 1, 2, 3 and 4 below for a more detailed explanation of the operation of the present invention in a non-interlaced fashion is now discussed. It may be seen that the several tables relate to the reading out of stored data from the various data line positions of a data source by parallel video channels which modulate their respective electron beams. The electron beams paint lines on a display screen at the various display line positions.

The tables are as follows:

| Table 1 RASTER NO. 1 | | | Table 2 RASTER NO. 2 | | | Table 3 RASTER NO. 3 | | | Table 4 RASTER NO. 4 | | |
|---|---|---|---|---|---|---|---|---|---|---|---|
| DATA LINE | VIDEO CHANNEL & BEAM NO. | DISPLAY LINE NO. | DATA LINE | VIDEO CHANNEL & BEAM NO. | DISPLAY LINE NO. | DATA LINE | VIDEO CHANNEL & BEAM NO. | DISPLAY LINE NO. | DATA LINE | VIDEO CHANNEL & BEAM NO. | DISPLAY LINE NO. |
| 1 | 1 | 1 | 1 | | 1 | 1 | | 1 | 1 | | 1 |
| 2 | 2 | 2 | 2 | 1 | 2 | 2 | | 2 | 2 | | 2 |

-continued

| Table 1 RASTER NO. 1 | | | Table 2 RASTER NO. 2 | | | Table 3 RASTER NO. 3 | | | Table 4 RASTER NO. 4 | | |
|---|---|---|---|---|---|---|---|---|---|---|---|
| DATA LINE | VIDEO CHANNEL & BEAM NO. | DISPLAY LINE NO. | DATA LINE | VIDEO CHANNEL & BEAM NO. | DISPLAY LINE NO. | DATA LINE | VIDEO CHANNEL & BEAM NO. | DISPLAY LINE NO. | DATA LINE | VIDEO CHANNEL & BEAM NO. | DISPLAY LINE NO. |
| 3 | 3 | 3 | 3 | 2 | 3 | 3 | 1 | 3 | 3 | | 3 |
| 4 | 4 | 4 | 4 | 3 | 4 | 4 | 2 | 4 | 4 | 1 | 4 |
| 5 | 1 | 5 | 5 | 4 | 5 | 5 | 3 | 5 | 5 | 2 | 5 |
| 6 | 2 | 6 | 6 | 1 | 6 | 6 | 4 | 6 | 6 | 3 | 6 |
| 7 | 3 | 7 | 7 | 2 | 7 | 7 | 1 | 7 | 7 | 4 | 7 |
| 8 | 4 | 8 | 8 | 3 | 8 | 8 | 2 | 8 | 8 | 1 | 8 |
| . | . | . | . | . | . | . | . | . | . | . | . |
| . | . | . | . | . | . | . | . | . | . | . | . |
| . | . | . | . | . | . | . | . | . | . | . | . |
| 1197 | 1 | 1197 | 1197 | 4 | 1197 | 1197 | 3 | 1197 | 1197 | 2 | 1197 |
| 1198 | 2 | 1198 | 1198 | 1 | 1198 | 1198 | 4 | 1198 | 1198 | 3 | 1198 |
| 1199 | 3 | 1199 | 1199 | 2 | 1199 | 1199 | 1 | 1199 | 1199 | 4 | 1199 |
| 1200 | 4 | 1200 | 1200 | 3 | 1200 | 1200 | 2 | 1200 | 1200 | 1 | 1200 |

Table 1 represents the operation of the invention for painting a first raster. Table 2 represents the operation of the invention while painting a second raster immediately following the first raster. Tables 3 and 4 illustrate the operation of the invention during third and fourth rasters, respectively. Referring now to Table 1, the heading "data line" refers to that portion of the video storage disc or other sensor data input device which contains sufficient information for displaying on one line of the display screen. For purpose of illustration it is considered that one line of stored data is painted on one display line and that there are 1200 display lines. The top three lines of which are either blanked or masked off so that they are not observable "Video channel and beam number" refers to the video amplifier channel and electron beam coupled thereto that are used to paint a display line on the screen. "Display line" refers to the positions on the display at which video data is displayed. The display screen under discussion here is considered having 1200 display line positions. In this particular example only four channels are used requiring only four electron beams. Referring to Table 1, illustrating a first raster, the first through fourth lines of stored data are painted on the first through fourth display lines by the first through fourth electron beams, respectively. The four beams are then deflected, in unison, downward four lines for reading out the fifth through eighth lines of stored data and painting those lines on the fifth through eighth display line positions. This readout and paint process of displaying four lines at a time continues until all 1200 lines of stored data have been read out and displayed.

Referring now to Table 2, the second raster commences after the first raster has been painted with the readout and painting of the second through fifth lines of stored data on the second through fifth display lines of the display screen by the first through fourth electron beams, respectively. The four beams are then deflected downward four lines and readout and paint the succeeding four lines of stored data and continue until all the stored data has been read out and displayed.

Referring now to Table 3, the third raster commences with the third through sixth lines of stored data being read out by the beam switching unit and being displayed on the third through sixth lines on the display screen by the first through fourth electron beams, respectively. The four beams then continue reading out the remaining lines stored data four-lines-at-a-time until the third raster has been completed.

Referring now to Table 4, the fourth raster commences when the first through fourth electron beams are used to paint the fourth through seventh lines on the display screen using the data stored on the fourth through seventh lines, respectively. The remaining lines of stored data are then read out four at a time for completing the fourth raster.

Upon completion of the fourth raster a fifth raster similar to the operation of the above-described first raster is commenced and the above-described readout and paint process continues.

It is again pointed out that the above-described sequence of reading out and painting of display lines in a descending staircase fashion is but one way of implementing the present invention. As ascending staircase sequence may also be used as could the random deflection of data readout and display line painting.

Figure 4:
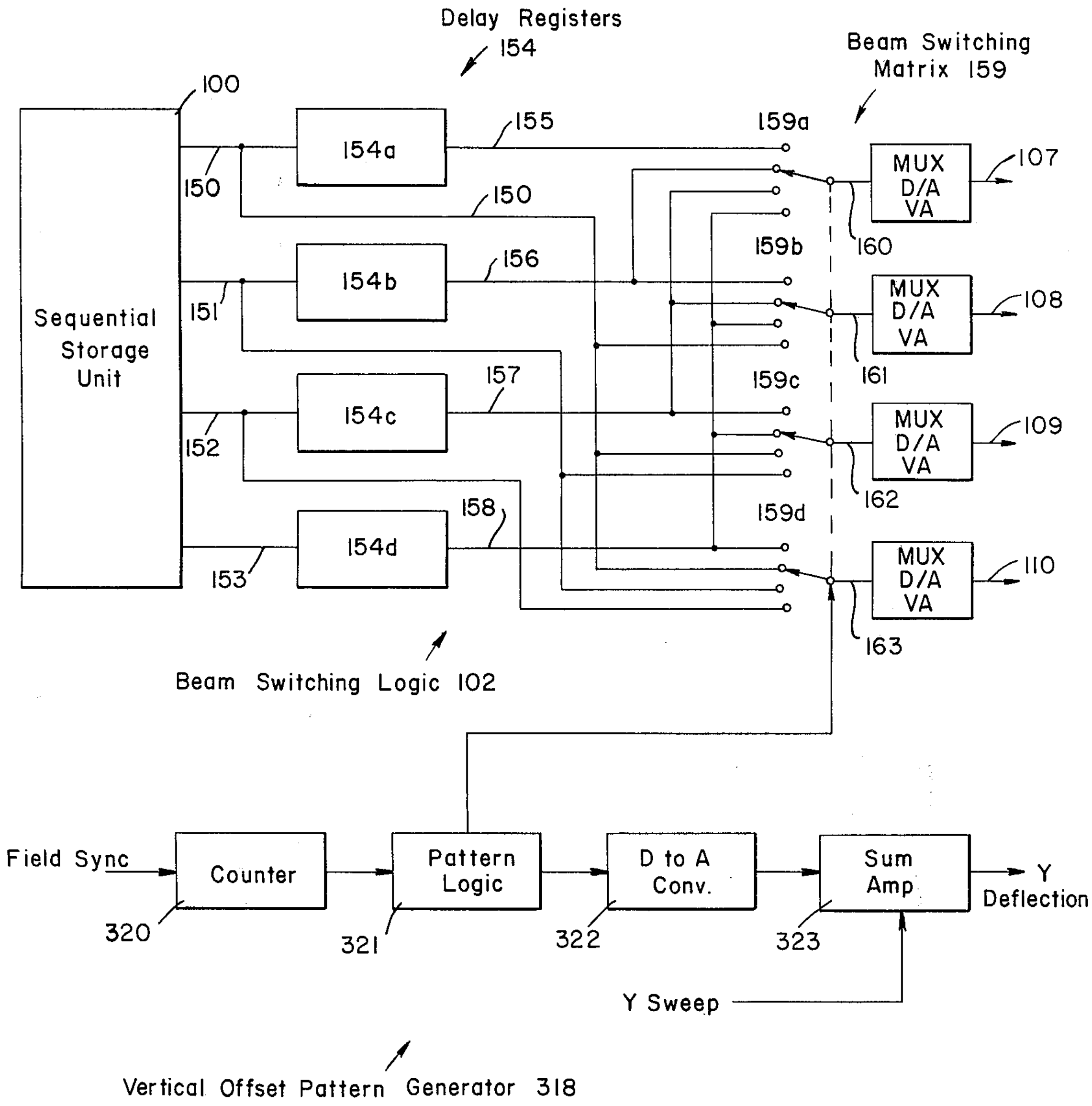
FIG. 4 is a schematic block and circuit diagram of a beam video drive switching logic that may be utilized by the present invention.

Referring now to FIG. 4, a more detailed description of the circuitry that may be used to practice the invention is herein discussed. The video disc, in storage unit 100 having four output channels, is coupled to the delay register circuit 154 via composite leads 150–153. The delay register circuit includes four shift register sections 154*a*–154*d*, each section containing 20 individual parallel shift four to accommodate four bits (16 levels) of intensity quantization. Each individual shift register is a length which accommodates one fifth of the serial elements comprising a display line. Each shift register section defines a channel.

The delay register 154 is connected to the beam switching matrix 159 via composite leads 155–158. The beam switching matrix 159 includes four switching sections 159*a*–159*d*, and each switching section includes a 20-pole, 4-position multiplexer switch. The shift register sections 154*a*–154*d* are coupled to the switch sections 159*a*–159*d* via leads 155–158 respectively. Three channels (leads 150–152) from the video disc 101 output are also connected to switching section 159*b*, *c* and *d* respectively of the multiplexer switch 159. For example, lead 150 is connected to section 159*b*, position 4; to section 159*c*, position 3; and to 159*d*, position 2. The output 155–158 from the shift register sections 154*a*–154*d* respectively are coupled to one or more beam switching matrix sections 159. The shift register section 154*b* is coupled to switch section 159*a*, position 2; and to switch section 159*b*, position 1. Shift register 154*c* is connected to switch section 159*a*, *b* and *c*, positions 3, 2, and 1, respectively. Shift register 154*d* is connected to switch sections 159*a*, *b*, *c*, and *d* at positions 4, 3, 2 and 1 respectively. The beam switching matrix 159 output is connected to the multiplexer and then to the D to A converter 103. Each section 159*a*–159*d* of the beam switching matrix 159 is coupled to a multiplexer via composite leads 160, 161, 162 and 163. Each composite lead contains 20 output leads. The multiplexer is utilized to convert the parallel memory data to high speed serial data. The output from the multiplexer is coupled to the D-to-A converter 103 and then in turn to the video gates 104. The D to A converter 103 converts the digital signals to analog signals. The beam switching matrix 159 is controlled by the vertical offset pattern generator 318.

The vertical offset pattern generator includes a counter 320 coupled to a pattern logic unit 321, which is coupled in turn to a D to A converter 322 and a summing amplifier 323. The vertical offset pattern generator 318 receives an input from the vertical sweep generator 313 (see FIG. 2*b*). The output of the generator 318 is coupled to the vertical deflection amplifier 307. The counter 320 (FIG. 4) counts the number of frames and applies stepping signals to the pattern logic 321 which in turn applies switching signals to the beam switching matrix 159 at the end of each frame. If a non-interlaced technique is used with a form beam CRT, the logic unit supplies a signal to the beam switching matrix 159 to begin the 4-step cycle anew. The pattern logic provides the proper video selection pattern to the beam switching matrix 159 for selecting the appropriate readout lines of stored data, for example, stepping to the next switch position on the next successive raster and returning back to the starting point after every four raster frames. The pattern logic 321 also provides a digital signal to the D to A converter 322 which in turn supplies an analog signal to the summing amplifier 323. The summing amplifier 323 sums the pattern logic 321 output and the vertical sweep generator 313 output and then provides the proper Y deflection to the vertical deflection amplifier.

The operation of the circuit according to FIG. 4 is now described with reference to that figure and FIG. 3 wherein a non-interlaced technique is used for purposes of discussion. The circuit of FIG. 4 is equally applicable to a display system utilizing an interlaced technique. The video disc in the sequential storage unit 100 provides four channels of output to the delay register sections 154*a*–154*d*. Each shift register section contains one line of stored data and each provides a one line delay. The shift register provides a one line delay for each channel so that the output multiplexers 103 can simultaneously access both the delayed output of the shift registers (four N lines) and the input to the shift registers (four N+1 lines).

The letters N and N+1 refer to the relative data timing i.e., N is a line of delayed data and N+1 is a non-delayed line of data. The beam switching matrix 159 provides switching between each video amplifier channel and the different storage output channels of the video disc 101. For a switching sequence in a linear descending four step staircase, the following table is considered.

| Lead | Frame 1 | 2 | 3 | 4 | 5 |
|---|---|---|---|---|---|
| 107 | 1 N | 2 N | 3 N | 4 N | 1 N |
| 108 | 2 N | 3 N | 4 N | 1 N+1 | 2 N |
| 109 | 3 N | 4 N | 1 N+1 | 2 N+1 | 3 N |

-continued

| Lead | Frame 1 | 2 | 3 | 4 | 5 |
|---|---|---|---|---|---|
| 110 | 4 N | 1 N+1 | 2 N+1 | 3 N+1 | 4 N |

The video lead refers to the video input to the beams in the CRT wherein lead 107 is coupled to the first beam where, lead 108 is coupled to the second beam, etc. The numerals in the table refer to the memory channel numbers. For example, 1 refers to the first line of data stored in the first line of the memory 101, 2 refers to the second line of data stored in the second line of the memory 101, etc.

The operation of the circuit of FIG. 4 is discussed in further detail by cycling the beam switching matrix through four frames. The beam switching matrix 159 is initially at a first position. All the data on the four channels is read out of the shift registers 154*a*–154*d*, to complete one frame. The vertical offset pattern generator 318 provides a signal to the beam switching matrix 159 to advance the switch sections to the second position. The pattern generator 321 also provides a beam deflection signal for deflecting the four beams one line position downward. In the second position i.e., the second raster or from the delayed data on the second, third and fourth channels is read out onto the first, second and third video channels, respectively. The non-delayed first channel from the memory 101 is read out on the fourth video channel coupled to the fourth beam. When all the data at this second position has been read out a second raster has been completed and the vertical offset pattern generator 318 provides a signal to the beam switching matrix 159 causing it to advance to the third position. The beams are again deflected one line position downward to the third line position by the pattern generator. At the third position the delay data from the third and fourth shift register sections 154*c* and 154*d*, respectively, is read out onto the first and second beam channels, respectively. The non-delayed first and second channels from the memory disc 101 are read out on the third and fourth video channels, respectively. At the end of this third data read-out a third frame is completed and the beam switching matrix 159 receives a signal from the vertical offset pattern generator 318 to advance the switches to a fourth position. In the fourth position delayed data in the fourth memory channel or shift register 155D is read out onto the first video channel. The non-delayed (N+1) data on the first, second, and third memory channels is read out on the second, third and fourth video channels, respectively. The vertical offset pattern generator 318 supplies the beam switching matrix 159 with a signal, resetting the switches in a first position to commence the fifth frame or raster.

The vertical offset pattern generator supplies a signal to the beam switching matrix 159 for providing the proper beam switching sequencing. The sequencing may be any suitable pattern, such as for example the one step at a time described above. The pattern generator 318 also supplies a signal to the Y deflection amplifier 307 so that the display is properly positioned on the screen. The frame sync supplies a digital signal to the frame counter then to the pattern logic 321. The pattern logic 321 supplies the proper switching pattern to the beam switching matrix 159. The pattern logic also supplies a signal to the digital-to-analog converter 322 and then to the summing amplifier which combines a signal from the Y sweep generator 313 for providing the proper alignment on the display picture on the screen.

Circuitry may also be provided for blanking out the top three and the bottom three lines on the display screen. Blanking or optical masking would be required because the top line is only displayed one-fourth of the time due to beam switching pattern. Since the frequency of presentation of the top display line is so low, it is within the flicker rate seen by the human eye. The second line from the top of the display is presented only one-half of the time and it also is within the flicker frequency seen by the human eye. The third line from the top is also within the flicker rate discernable by the human eye.

Figure 5:
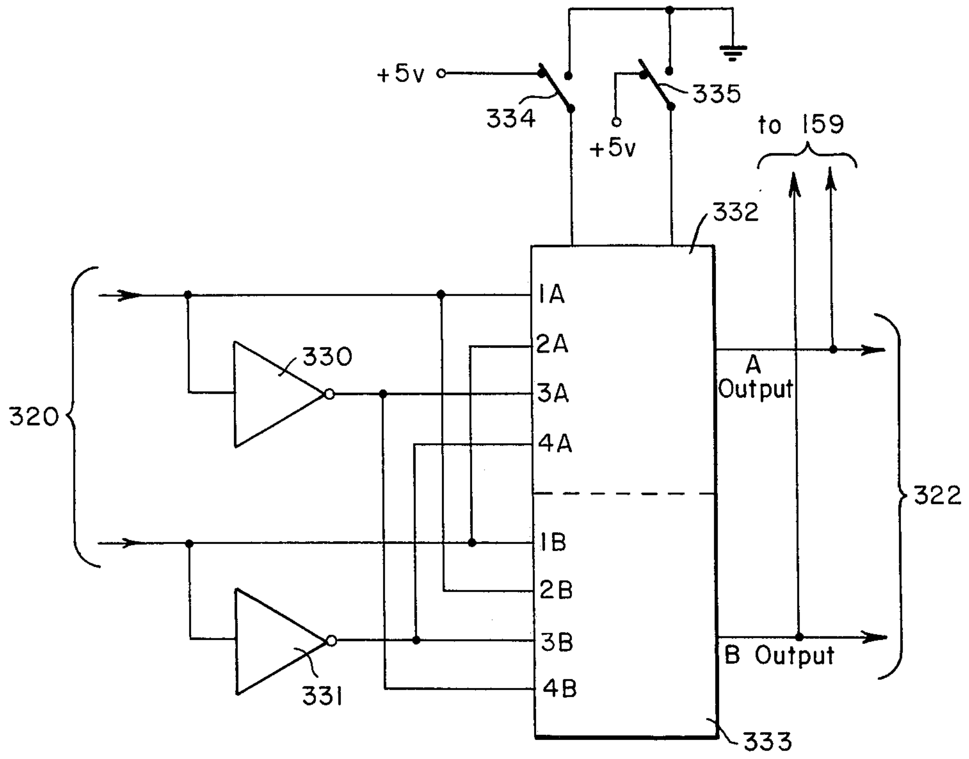
FIG. 5 is a schematic block diagram of a pattern logic unit of FIG. 4.

Referring more specifically to FIG. 5, a pattern logic circuit 321 is now described. First and second output terminals of the counter 320 are connected to first and second inverters 330 and 331, respectively. The first output terminal of the counter 320 is also connected to a first input terminal of a first multiplexer 332 and a second terminal of a second multiplexer 333. The inverter 330 is connected to a third terminal of the multiplexer 332 and to the fourth terminal of the multiplexer 333. The second terminal of the counter 320 is connected to the second terminal of the first multiplexer 332 and to the first terminal of the second multiplexer 333. The output terminal of the inverter 331 is coupled to the fourth input terminal of the multiplexer 332 and to the third input terminal of the multiplexer 333. Two 2-position switches 334 and 335 are connected to the control terminals of the multiplexers 332 and 333. The first positions of the switches 334 and 335 are connected to ground potential and the second positions are connected to +5 volts. The output terminals of the multiplexers 332 and 333 are coupled to the beam switching matrix 159 and the D to A converter 322. The dual four-bit multiplexers 332 and 33 may be a Fairchild Model 54153.

The operation of the circuit according to FIG. 5 is now described. The positioning of switches 334 and 335 between ground potential and +5 volts determines the multiplexing sequence of the multiplexers 332 and 333. The multiplexers 332 and 333 in turn determine the beam switching sequence which will be followed in presenting the lines of video data on the display screen. For example, if the both switch positions are on ground the multiplex output sequence may be 1A, 2A, 3A, 4A. If however one switch position is +5 volts and the other switch position is ground the multiplexer output may be 2A, 3A, 4A, 1A. The pattern logic 321 controls the switching sequence of the multiplex switch 159 for reading the data from the storage unit 100. The circuit 321 also controls the vertical or Y deflection so that the electron beams are deflected the necessary amount for writing the lines of video data at the proper line position on the screen.

As mentioned above a four beam CRT may be used for providing an interlaced function. Such a single four beam device may utilize circuitry as depicted in FIG. 6. The four beam interlaced system is preferred embodiment of the invention since there is no inherent alignment problem between different sets of beams. The components of FIG. 6 that are similar to the components of FIG. 2 are identified by the same reference designations. It is noted that FIG. 6 is similar to FIG. 2 with the exception that there is no switching arrangement such as circuits 123, and 111*a*–111*b*. The video gates 104 now provide an input directly to the master contrast circuits 114 on leads 107–110. The remainder of the video circuit is identical to the circuit of FIG. 2, including for example, video amplifier 115, coupling capacitor 117, and brightness and contrast controls 119 and 121, respectively. It is noted that the video gate outputs are now coupled to only the four beam control grids 207–210 in the CRT instead of the grids 207–214 as in FIGS. 2*a* and 2*b*.

Figure 6:
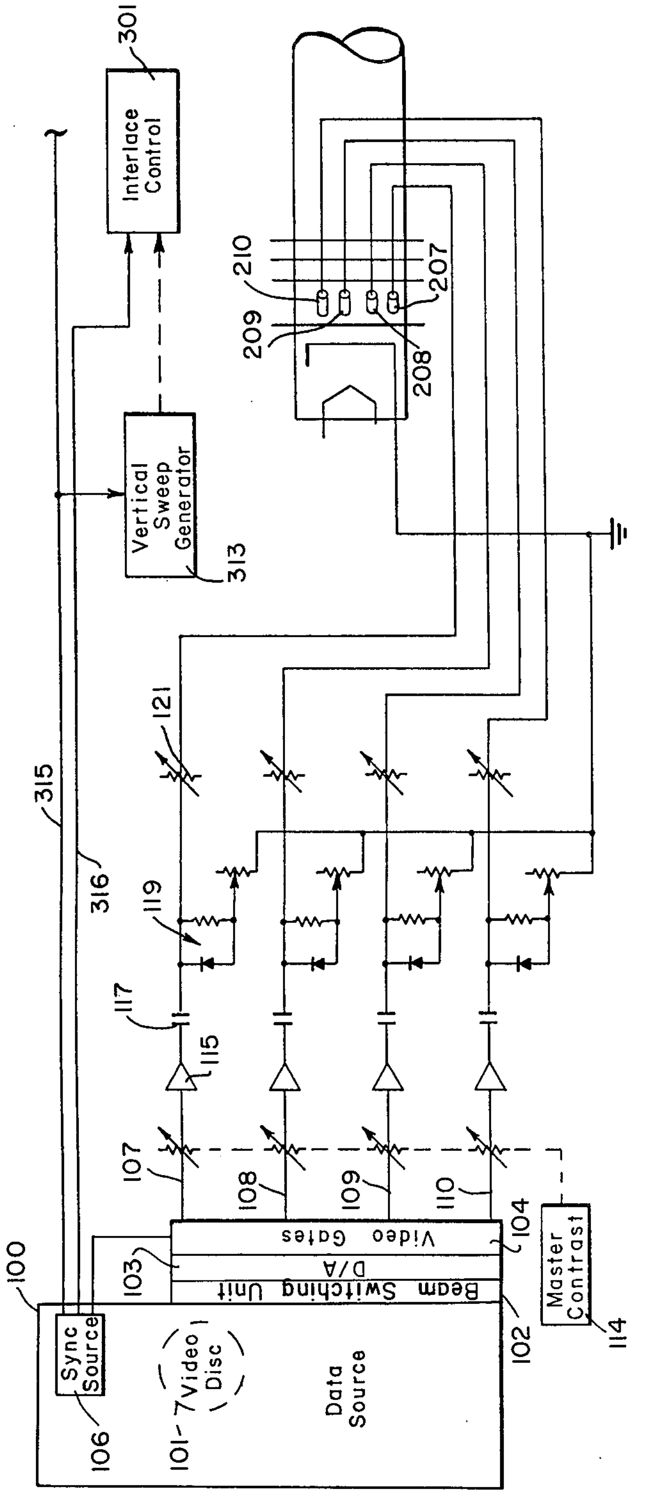
FIG. 6 is a schematic block and circuit diagram depicting a four beam display system in accordance with the principles of the present invention.

It is further noted that only a portion of the CRT of FIG. 2*b* has been illustrated in FIG. 6. As mentioned above, the embodiment according to FIG. 6 contains only four beam sources that operate continually instead of eight beam sources that operate intermittently. The dashed line connects the interlace control 301 to the vertical sweep generator 313. The interlace control 310 supplies a signal to the vertical sweep generator 313 for deflecting the beams from the grids 210–213 down one line to provide the interlace function.

The operation of the invention according to the embodiment of FIG. 6, is essentially the same as explained above for FIGS. 2*a* and 2*b* with the exception that there is no switching function as provided by circuit 123 and 111*a*–111*d*. The video gate 104 provides an output to the grid 207 through the lead 107. The video gates 104 supply outputs on leads 108, 109 and 110 to grids 208, 209, and 210 respectively. The four grids 207–210 paint a first field of a 2 field raster or frame in unison. Upon completion of the first field the interlace control 301 supplies the vertical sweep generator with an input signal for deflecting the group of beams 207*b*–210*b* down one line and commencing the second field of the two field frame.

Figure 7:
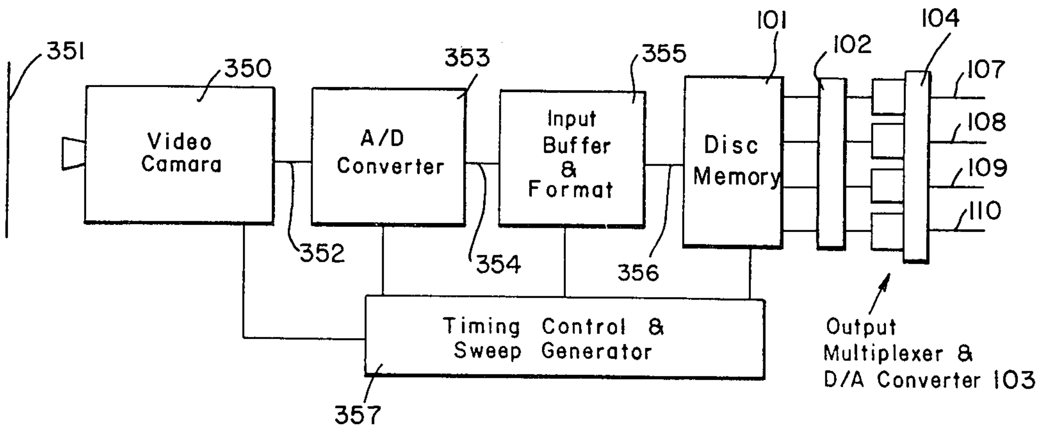
FIG. 7 is a schematic block and partial perspective diagram showing a typical arrangement that may be utilized to provide the stored data in the system of FIGS. 2*a* and 2*b*.

Referring now to FIG. 7, a simplified block diagram is shown to illustrate one scheme that may be utilized to provide the data for a multi-beam display in accordance with the invention. In the illustrated arrangement a camera 350 may view a scene indicated by a line 351 which may be a chart or desired area. The video signal developed by the camera 350 which may be any conventional type of camera, is applied through a suitable lead 352 to an analog-to-digital (A to D) converter 353 and then in digital form through a composite lead 354 to an input buffer and format logic unit 355. The data sequencing provided by the circuit 355 depends upon the type of format used, that is, the number of beams and whether or not it is interlaced on the final picture. The buffer unit is properly timed to place the data in proper position so that when it is applied on a composite lead 356 to the disc memory 101, it is stored in the proper positions for being read out in parallel on the proper leads and in a correct sequence. A timing control and sweep generator unit 357 controls each of the units so that the data is properly stored in the memory 101. It is to be noted that this storage of the data is not necessarily in real time and very slow scan camera operation may be utilized. Upon completion of data storage in the disc memory 101, the digital data may be passed through the output multiplexer and the digital-to-analog converter unit 103. The D/A unit 103 provides signals to the video gates unit 104 then to the leads 107–110 as illustrated in FIGS. 2 and 5.

Figure 8A:
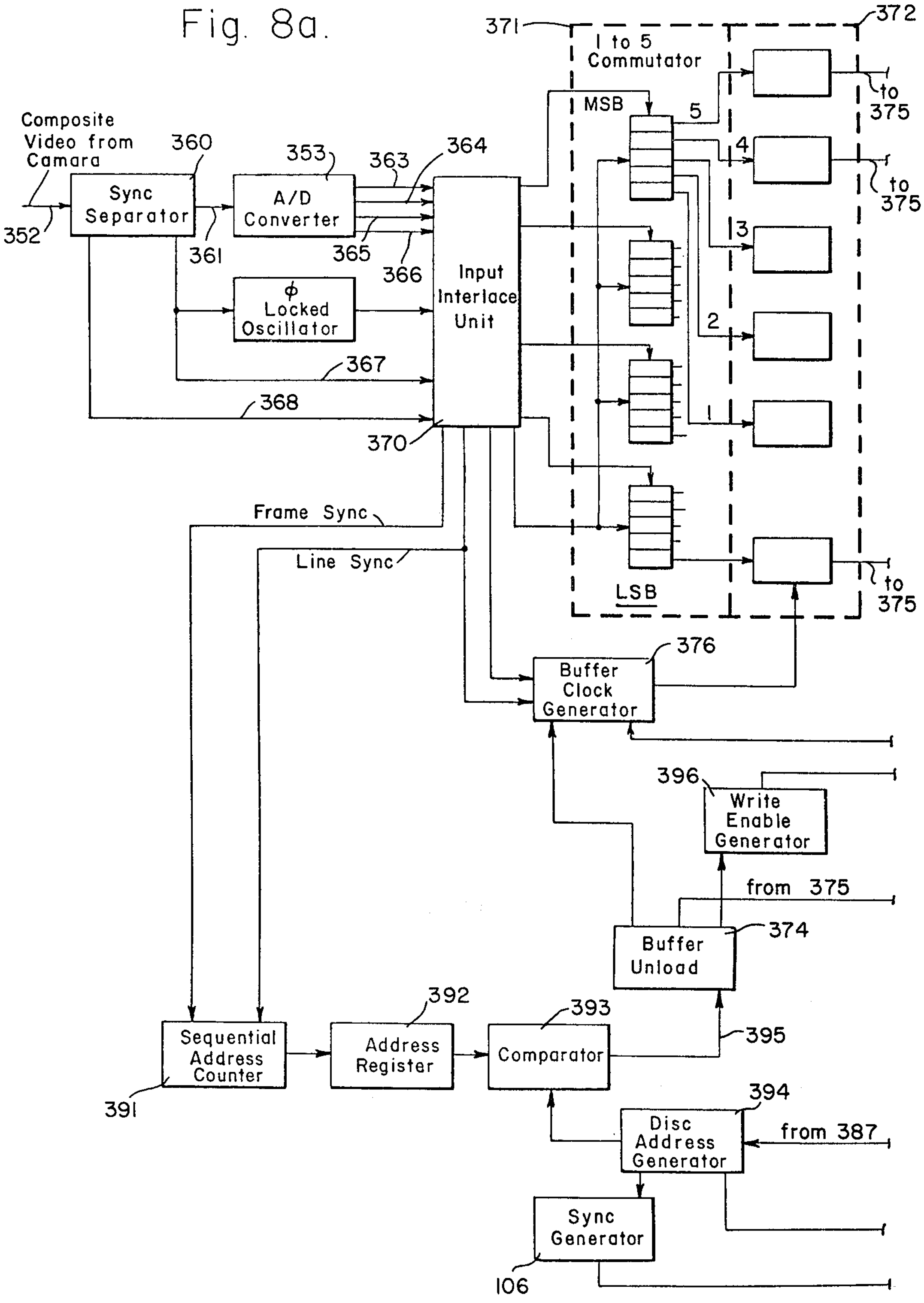
FIGS. 8*a* and 8*b* are schematic block diagrams of a digital scan converter that may be utilized in the system of the invention to provide the video data.
Figure 8B:
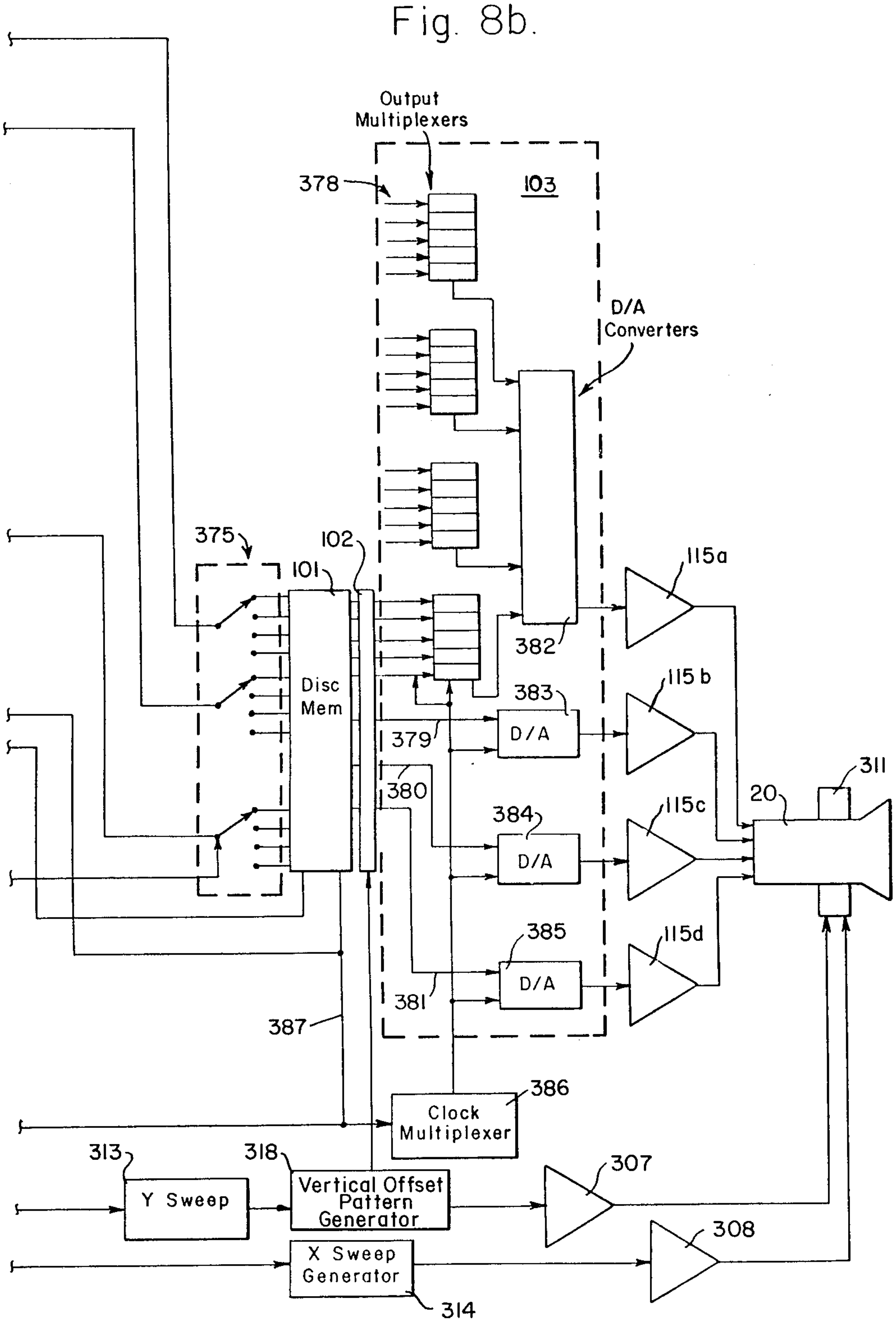

Referring now to FIGS. 7, 8*a*, and 8*b*, a more detailed example is given using a circuit that converts a standard single channel video signal into four parallel video channel signals wherein the four channels paint a raster four lines at a time on a display screen in accordance with the principles of the invention. Since four beams are simultaneously generating a display, a system must be utilized that provides four parallel video channels outputs from a standard single channel input.

Composite video from the camera 350 (FIG. 7) is received on the lead 352 and is applied to the synchronizing signal separator 360 FIG. 7*a* which may be of a conventional type including clipping circuits and which applies the video signal on a composite lead 361 to analog-to-digital (A/D) converter 353 which in turn provides four bits of video data on leads 363 to 366 (composite lead 354). The synchronization signal separator 360 applies a horizontal synchronizing signal to a lead 367 and a vertical synchronizing signal to a lead 368 with the horizontal synchronizing signal applied to a phase-lock oscillator 369, to develop an element synchronizing signal equal to the number of displayed elements per line such as 1500. The four bit video signal which represents a signal display element or a portion such as 1/1500 of a line and synchronizing signals are applied to an interface electronics unit 370 which provide suitable amplification and impedance matching. The digital video signal is applied from the interface unit 370 on four leads to a 1 to 5 commutator 371 which may include four registers or shift registers, each having five flip-flops and each register receiving a different significant bit of the video intensity codes. The output of the commutator 371 on 20 leads is applied to an input buffer unit 372 which includes 20 registers with 300 flip-flops per register so that the stored output therefrom can be applied to 20 parallel channels of the main disc memory. A channel select logic or gate unit gates the video data through 20 of 80 leads to a disc memory 101 in response to a buffer unload control logic unit 374 responding to a comparison of the input address and the disc memory address. All of a line is transferred through the first switch position of the twenty switches of the logic unit 375 followed by a change of switch positions to transfer the next line into the disc. Thus, four lines are stored for parallel read-out. The input line buffer unit 372 also receives the buffer clock signal from a clock 376, which in turn responds to a shift or comparison signal from the control logic unit 374. When the buffer clock generator 376 which is a three position switch is enabled by the line sync signal, the element sync singal is applied to the shift registers to transfer bits therein and when the clock generator is enabled by an address comparison, the disc clock is applied to the buffers to transfer the bits to the channel select unit 375. In the illustrated arrangement, the channel select logic unit 375 may include 20 continually rotating switches so that the data of four display lines is entered into eighty tracks of the disc memory 101. The next four lines being placed in the same 80 tracks (each line may occupy 20 parallel tracks). The disc memory 101, which may include 80 tracks, applies the video on four composite leads 378 to 381, each of 20 lines, to respective output multiplexers and D to A converter units 382 to 385 through the beam switching logic 102. The output multiplexers and D to A converter units are responsive to the high speed multiplexer clock 386 receiving disc clock signals from a lead 387 as derived from the disc memory 101. The four shift registers receiving the video signals for one line on the first lead 378 are shown in detail with the four bits of a line being loaded at a first pulse rate in response to 300 clocks and transferred to the D/A converter at a second pulse rate in response to 1500 pulses, for example. Each of the composite leads 378 to 381 passes a line of data, five elements at a time. In other words, the illustrated arrangement transfers five elements into the disc memory at one time and transfers five elements at a time out of the disc memory. The analog video is then applied from the D/A converter units 382 to 385 through the video gates unit 105 (not shown) and then through the the respective video amplifiers 386 to 389 and in turn through suitable leads to the electron gun control electrodes in an illustrated four beam cathode ray tube 20. The output multiplexers and the D to A converters of FIG. 8*b* correspond to the D/A converter 103 of FIGS. 2*a* and 6. The video amplifier units 386 to 389 of FIG. 8*b* correspond to the video amplifiers shown in FIG. 2*a*.

For providing the proper address for data to be written or recorded into the disc memory 101, a sequential address counter 391 receives frame sync and line sync signals to apply address values to a storage unit 392 which is in turn applied to a comparator unit 393. In response to the disc clock on lead 387, a disc address generator 394 develops a disc address which is applied to the comparator 393 to develop a write enable pulse when the input video line address compares with the address, which pulse is applied through a lead 395 as a compare pulse to the buffer unload control logic unit 374. The clock generator 376 includes a switch that is enabled to apply a disc clock pulse to the buffers during readout into the disc. Also, the compare pulse is applied to a write enable generator unit 396 to enable the disc memory 101.

The disc address generator unit 394 also applies an address to a synchronizing generator 106 to apply a signal to an X sweep generator 314. The disc address is further used in a Y sweep unit 313 to convert the address to a Y sweep signal. The X and Y sweep signals are applied through suitable deflection amplifiers 307 and 308 to the cathode ray tube 20 deflection yoke 311 as previously explained. The Y sweep signal is also applied to the vertical offset pattern generator 318 for controlling the beam switching logic 102.

Figure 9:
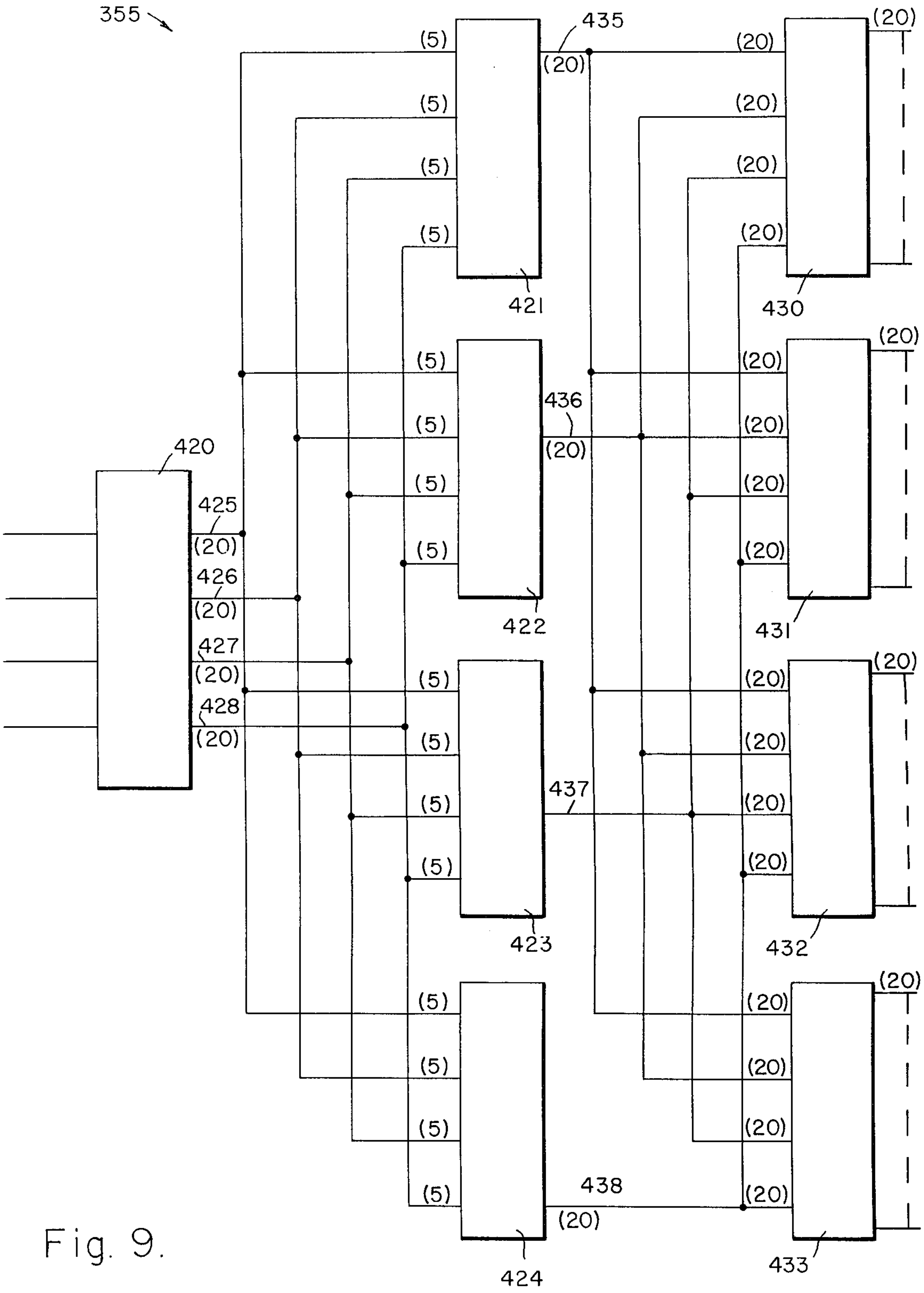
FIG. 9 is a schematic block diagram of an input buffer and format logic circuit of FIG. 7.

Referring more specifically to FIG. 9, the input buffer and format network 355 includes a commutator network 420, four shift register networks 421–424 and four multiplex networks 430–433. Input signals are provided to the commutator network 420 on the composite lead 354. The commutator network 420 is connected to each of the four shift register circuits 421, 422, 423 and 424 by composite leads 425, 426, 427 and 428. Each of the composite leads 425–428 includes 20 parallel channels. The shift register networks 421–424 are connected to each of the multiplexers 430, 431, 432 and 433 by composite leads 435, 436, 437 and 438. The shift registers 421–424 individually supply 20 parallel leads to each of the multiplexers 430–433. Each of the multiplex networks 430–433 provides 20 parallel output signals to the disc memory on the composite lead 356. A more detailed description of the components of FIG. 9 may be found in FIGS. 10–12.

Figure 10:
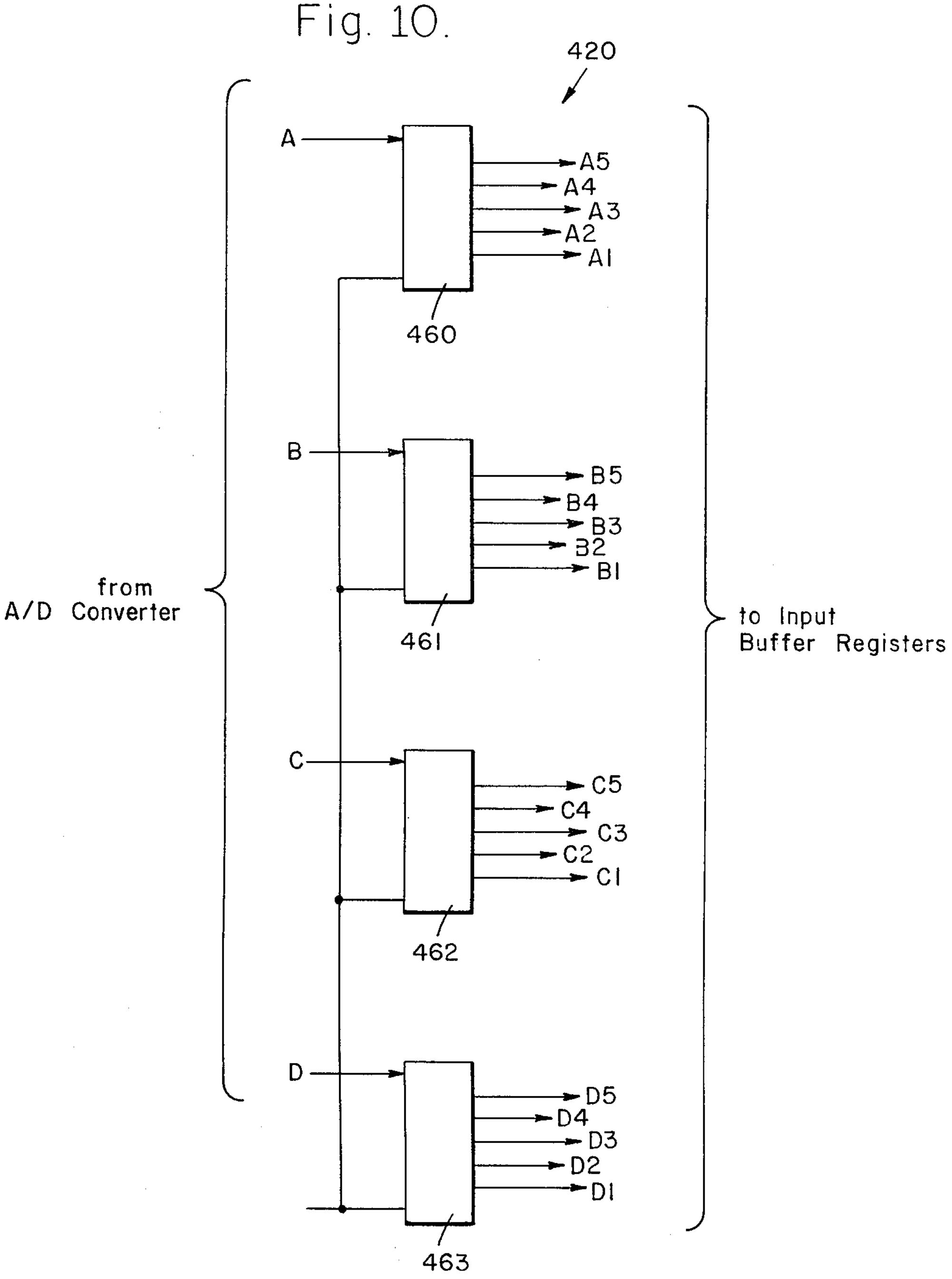
FIG. 10 is a schematic block diagram of input commutators of FIG. 9.

Referring now to FIG. 10, the commutator network 420 includes four individual input commutators 460, 461, 462 and 463, one for each of the video channels A, B, C and D. The commutator 460–463 may be integrated circuits type 4796 manufactured by one of the integrated circuit manufacturers such as Signetics or Fairchild. The commutators 460–463 are five bit shift registers which receive four bit video input serially and supply output video on twenty parallel lines, on composite leads 425–428, at one fifth the input rate. In other words, four bit video data is provided to the commutators 460–463 serially and each bit is split into five channels which are in turn provided to the shift register buffers 421–424.

The commutator 460 provides output signals A1, A2, A3, A4 and A5 to the buffer input registers. The second input commutator 461 provides output signals B1, B2, B3, B4 and B5. The third input commutator 462 provides output signals C1, C2, C3, C4 and C5, and the fourth input commutator 463 provides signals D1, D2, D3, D4 and D5. The output signals from each of the commutators 460–463 are provided to each of the input buffer registers 421–424. Clock signals from the timing control and sweep generator 357 are connected to each of the input commutators 460–463 for controlling the shift of video data through the registers.

Figure 11:
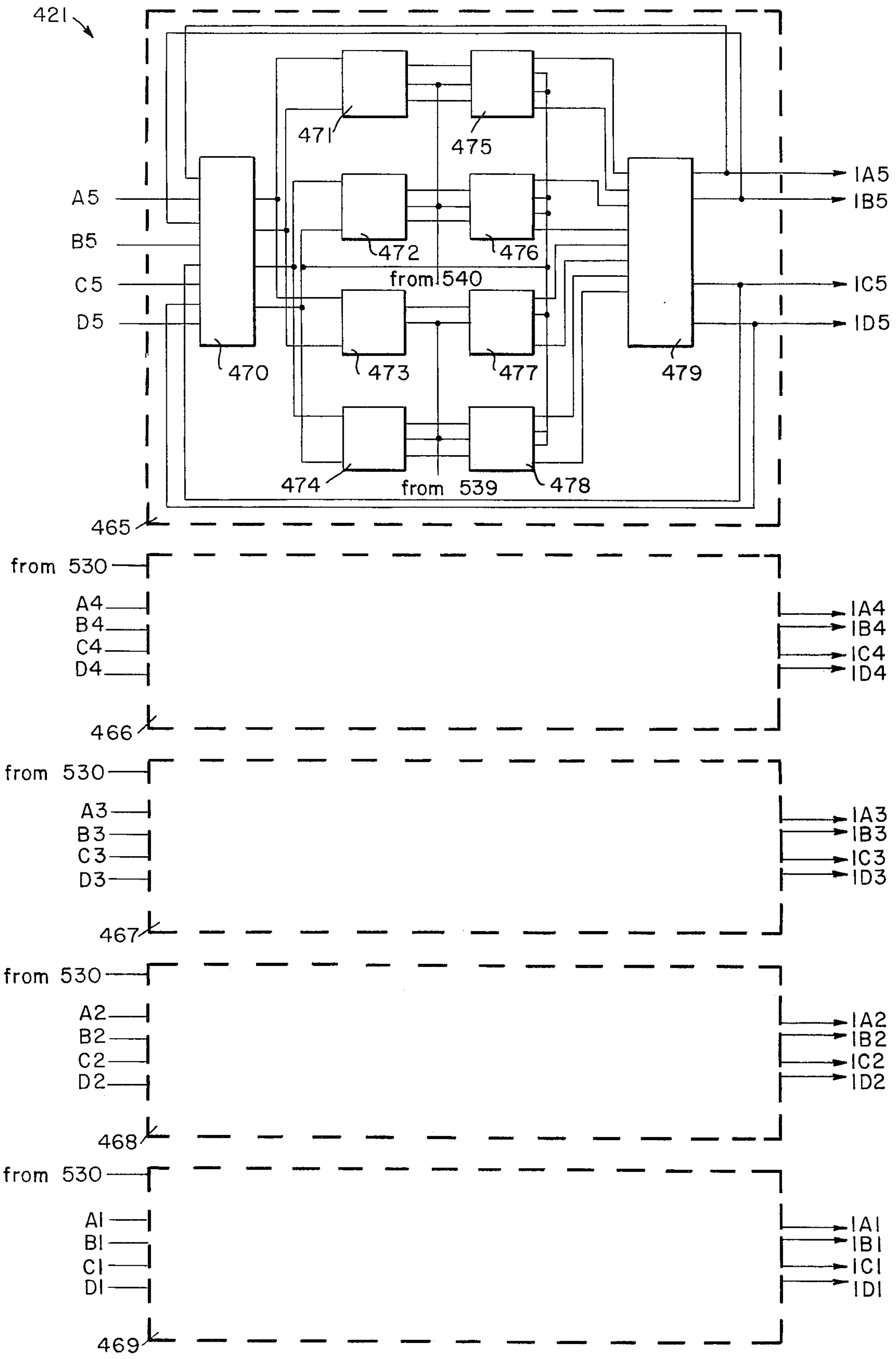
FIG. 11 is a schematic block diagram of buffer registers of FIG. 9.
Figure 12:
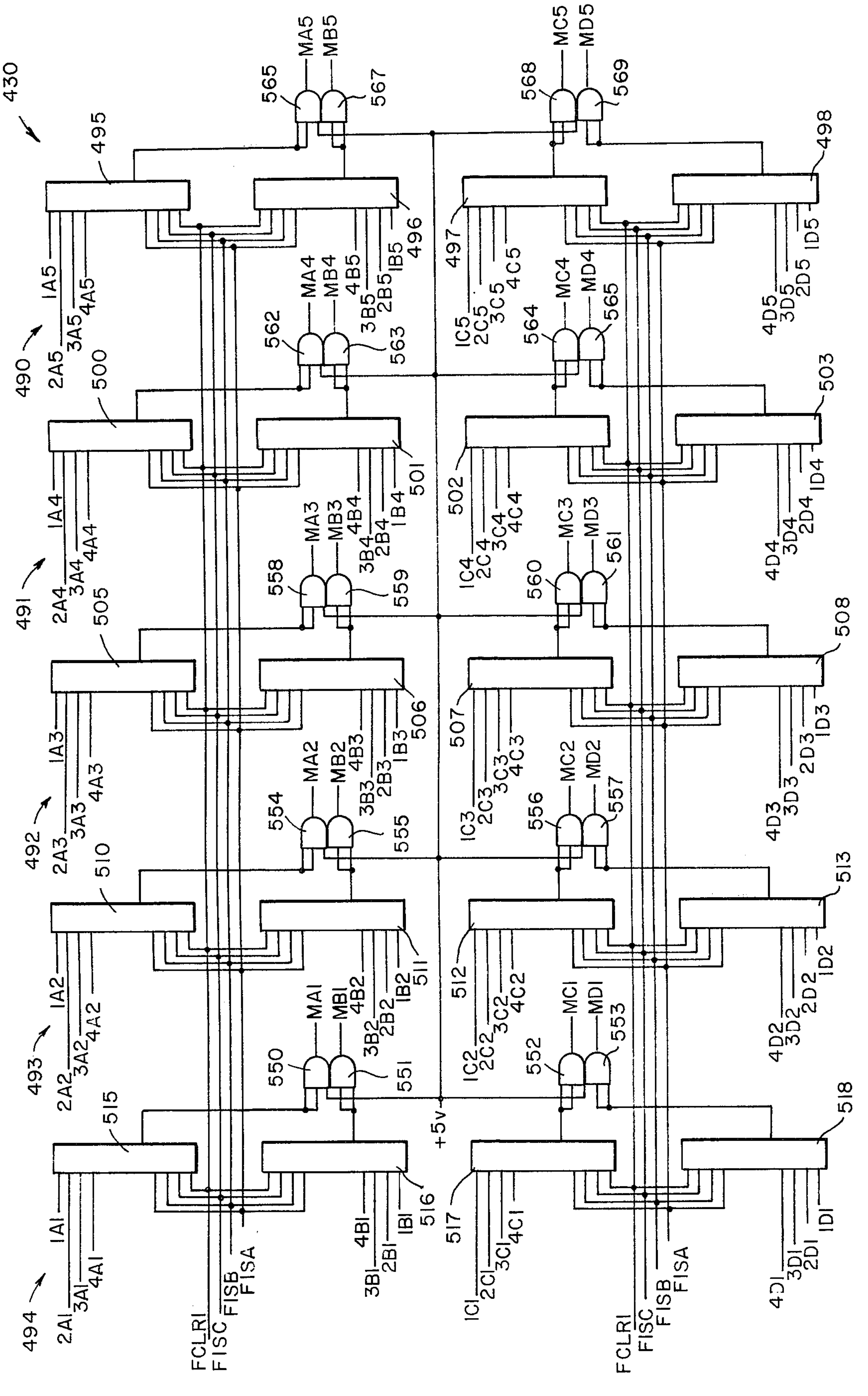
FIG. 12 is a schematic block diagram of multi-plexers of FIG. 9.

Referring more specifically to FIG. 11, the line buffer reqister 421 includes five shift register networks 465, 466, 467, 468 and 469. Only shift register network 465 is discussed in detail since the five shift register sections 465–469 are identical. Each of the five shift register sections holds one line of video data until access is provided to the memory for storing the data therein.

The shift register section 465 includes a one-to-two commutator 470 which may be model number 8233 manufactured by National Semiconductor, Inc. The shift register 470 provides input terminals for the signals A5, B5, C5, and D5 from the commutators 460, 461, 462 and 463, respectively. First and second output terminals of the commutator 470 are connected to dual shift registers 471 and 473. Third and fourth output terminals of the commutator 470 are connected to dual shift registers 472 and 474.

The dual shift registers 471–474 may be model number 2509A manufactured by Signetics, Inc. These shift registers store 100 bits of information each. The output terminals of the shift registers 471–474 are connected to dual shift registers 475–478, respectively. The shift registers 475–478 store 50 bits of video information and may be model number 2810A manufactured by Signetics, Inc. Each pair of dual shift registers, such as 471 and 475, stores a total of 150 bits of video information. The output terminals of dual shift registers 475–479 are connected to the input terminals of a multiplexer 479, which provides output signals 1A5, 1C5 and 1D5 to the multiplexer 490 of the multiplex switch 430. The second shift register section 466 also provides output signals to the multiplex switches 431–433. A feedback loop is also provided between the output terminals of the multiplexer 479 and the commutator 470.

The second shift register Section 466 of the network 421 provides input terminals for signals A4, B4, C4 and D4 from the commutators 460–463, respectively. Output signals 1A4, 1B4, 1C4 and 1D4 are provided by the register 466 to the multiplexer 491.

The third shift register section 467 of the network 421 provides input terminals for signals A3, B3, C3 and D3 from the commutators 460–463, respectively. Output signals 1A3, 1B3, 1C3, and 1D3 are provided by the shift register 467 to the multiplexer 492 of the multiplex switch 430. The third shift register section 467 also provides output signals to the multiplex switches 431–433.

The fourth shift register section 468 of the network 421 receives input signals A2, B2, C2 and D2 from the commutators 460–463, respectively. Output signals 1A2, 1B2, 1C2 and 1D2 are supplied by the register 468 to the multiplexer 493. The section 468 also provides output signals to the multiplex switches 431–433.

The fifth shift register section 469 of the network 421 receives input signals A1, B1, C1 and D1 from the commutators 460–463, respectively. Output signals 1A1, 1B1, 1C1 and 1D1 are supplied by the register 469 to the multiplexer 494. The fifth section 461 also provides output signals to the multiplex switches 431–433.

The four dual shift registers in the five shift register sections 465–469 hold video data for four display lines of 1500 elements per line. Each of the 1500 elements is defined by four bits of video data. The register sections 465–469 contain 300 cells each.

The second shift register network 422, not shown in detail, is similar to the first shift register network 421. The network 422 receives input signals from the commutator network 420. The output signals of the first shift register section in the shift register network 422 are 2A5, 2B5, 2C5 and 2D5. The second shift register section in the network 422 provides output signals: 2A4, 2B4, 2C4 and 2D4. The third shift register section in the network 422 supplies signals: 2A3, 2B3, 2C3 and 2D3. The fourth shift register section of the network 422 supplies signals: 2A2, 2B2, 2C2 and 2D2. The fifth shift register section in the network 422 provides signals: 2A1, 2B1, 2C1 and 2D1. The network 422 provides a total of 20 parallel output signals to the multiplex switches 430–433.

The third shift register network 423, not shown in detail, is also similar to the first shift register network 421. The network 423 receives input signals from the commutator network 420. The output signals from the first shift register section of the network 423 are: 3A5, 3B5, 3C5 and 3D5. The second shift register section of the network 423 provides output signals: 3A4, 3B4, 3C4 and 3D4. The third shift register section of the network 423 supplies output signals: 3A3, 3B3, 3C3 and 3D3. The fourth shift register section of the network 423 supplies output signals: 3A2, 3B2, 3C2 and 3D2. The fifth shift register section of the network 423 provides output signals: 3A1, 3B1, 3C1 and 3D1. The network 423 provides a total of 20 parallel output signals to the multiplex switches 430–433.

The fourth shift register network 424, not shown in detail, is similar to the first shift register network 421. The network 424 receives input signals from the commutator network 420. The output signals from the first shift register section of the network 424 are: 4A5, 4B5, 4C5 and 4D5. The second shift register section of the network 424 provides output signals: 4A4, 4B4, 4C4 and 4D4. The third shift register section in the network 424 supplies output signals: 4A3, 4B3, 4C3 and 4D3. The fourth shift register section of the network 424 supplies output signals: 4A2, 4B2, 4C2 and 4D2. The fifth shift register section of the network 424 provides signals: 4A1, 4B1, 4C1 and 4D1. The network 424 provides a total of 20 parallel output signals to the multiplex switches 430–433.

The multiplex switch 430 includes five multiplex networks 490, 491, 492, 493 and 494. Each of the multiplex networks 490–494 include four individual multiplexers. For example, multiplex section 490 includes four multiplexers 495, 496, 497 and 498. Multiplex section 491 has four 4 to 1 multiplexers 500, 501, 502 and 503. Multiplex section 492 has four 4 to 1 multiplexers 505, 506, 507, and 508. Multiplex section 493 includes four 4 to 1 multiplexers 510, 511, 512 and 513, and multiplex section 494 has multiplexers 515, 516, 517 and 518. A line driver is connected to the output terminals of each of the multiplexers for driving 10 foot leads coupled to the input terminals of the disc memory 101. The multiplexer switch 430 switches the 20 outputs from the line buffer sections 465–469 into the proper 20 input sections of the disc memory 101.

Figure 13:
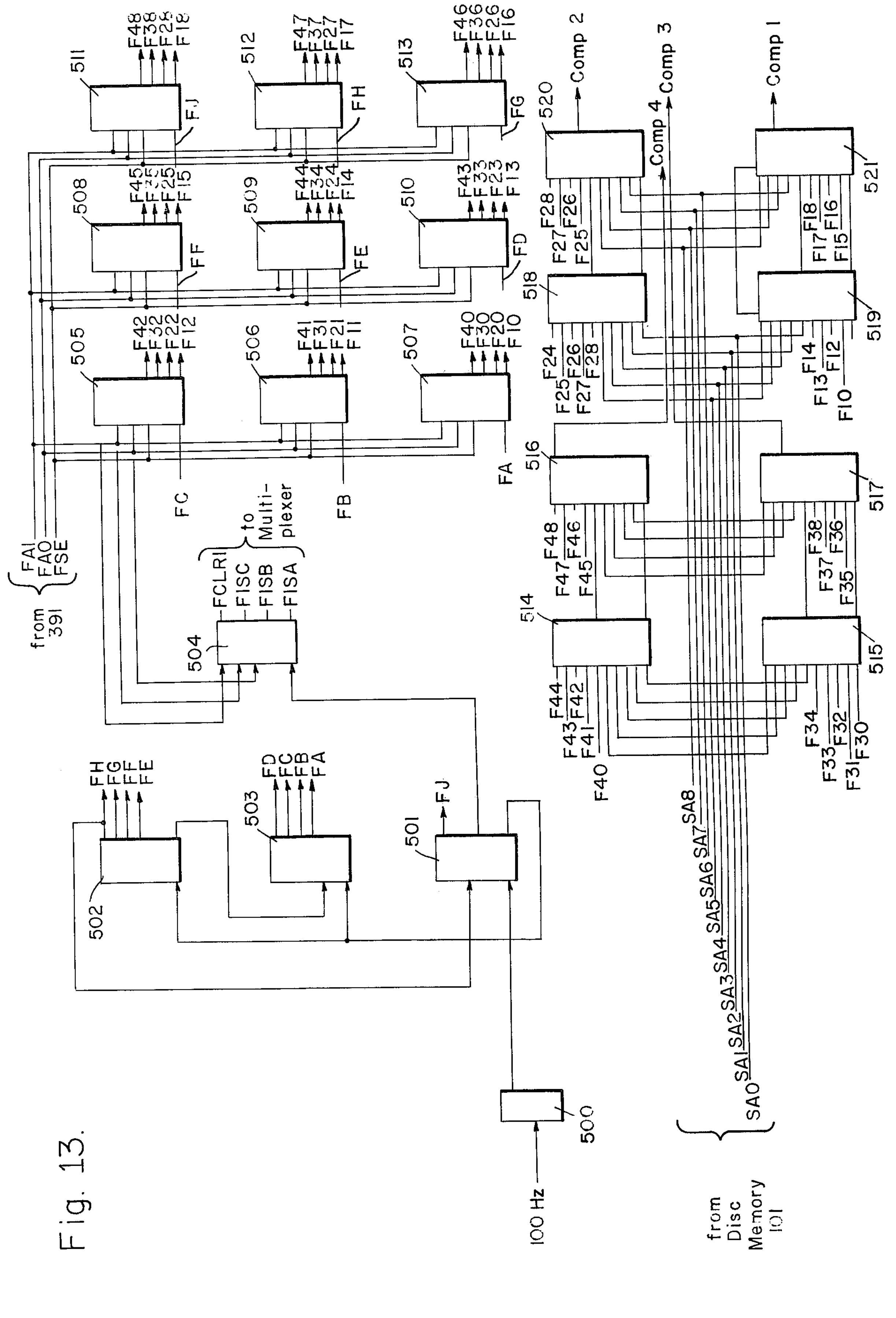
FIG. 13 is a schematic block diagram of a timing control and sweep generation circuit of FIG. 7.

Referring more specifically to FIG. 13, the timing control and sweep generator 357 is now described. The unit 357 controls the data flow from the video camera 350, the A/D converter 353, the input buffer and format unit 355 and the memory disc 101. The sweep generator for the camera 350 may be a suitable commercially available unit such as Model 501 manufactured by Colorado Video Camera.

Referring more specifically to the timing control portion of the unit 357, a counter 500, having several flipflop circuits, receives a 100 Hz. clock pulse. The counter 500 sets the field state, i.e., either first or second field, of a two-field raster. The counter 500 may be of the type 74107, manufactured by Texas Instruments or National Semiconductor, Inc.

A second flipflop of the counter 500 is connected to a counter 501, which in conjunction with each other, provide four bits of information for determining the sequential beam addressing. Sequential beam addressing refers to the line of video data that a preselected beam in the electron gun will display on the display screen.

The counter 501 is connected to counters 502 and 503, which control the vertical line address. The counters 502 and 503 are each 9-bit counters of the type 9316 manufactured by Fairchild. First through fourth output terminals of the counter 502 are designated as FE, FF, FG and FH, and are connected to four-bit latches 509, 508, 513 and 512, respectively. First through fourth output terminals of the counter 503, designated FA, FB, FC and FD, are connected to four-bit latches 507, 506, 505 and 510, respectively.

One output terminal of the counter 501 is connected to the four-bit latch 513. Timing signals for the latches to store the line address information are provided to each of the nine latches 505–513 by signal leads FA0, FA1 and FSE from the sequential address counters 391. Each latch can stow four addresses and the signals FA0, FA1 and FSE determine the storage location of those addressees.

One output terminal from the flip-flop 501 is connected to a latch 504 which flip-flop supplies the beam number data to the latch 504. The output terminal of the latch 504 is connected to the control terminals of the video multiplexers 430–433 which writes the proper video data in the proper location on the disc 101. The four-bit latches 504–513, inclusive, may be Model 9334, manufactured by Fairchild.

Each of the latches provides four output terminals which are selectively connected to eight comparators 514–521. The output terminals of latch 505 are designated F12, F22, F32 and F42. The output terminals of the latch 506 are designated F11, F21, F31 and F41. The output terminals of the latch 507 are designated F10, F20, F30, F40. The output terminals of the latch 508 are designated F15, F25, F35, F45. The output terminals of the latch 509 are designated F14, F24, F34, F44. The output terminals of the latch 510 are designated F13, F23, F33, F43. The output terminals of the latch 511 are designated F18, F28, F38, F48. The output terminals of the latch 512 are designated F17, F27, F37, F47. The output terminals of the latch 513 are designated F16, F26, F36, F46.

The input terminals to the comparator 514 are designated F40, F41, F42, F43, F44. The output terminals of the comparator 515 are designated F30, F31, F32, F33 and F34. The input terminals to the comparator 516 are designated F45, F46, F47 and F48. The input terminals of the comparator 517 are designated F35, F36, F37 and F38. The input terminals for the comparator 518 are designated F20, F21, F22, F23 and F24. The input terminals to the comparator 519 are designated F10, F11, F12, F13 and F14. The input terminals of the comparator 520 are designated F25, F26, F27, and F28. The input terminals of the comparator 521 are designated F15, F16, F17 and F18. Input signals are provided to the comparators 514–521 via input leads designated SA0, SA1, SA2, SA3, SA4, SA5, SA6, SA7 and SA8 from the disc memory 101. The comparators compare the sector address from the disc with the address supplied by the latches 505–513 and provide an output signal whenever the sector address and the line address are identical.

The operation of the timing control portion of the timing control and sweep generator 357 is now discussed. The 100 Hz. clock sets the field state in an interlaced system in the counter 500. The counters 500 and 501 together provide the sequential beam addressing that determines which of the four beams will scan a given line. The counters 501, 503 and 504 in response to the counter 500 provide the vertical line addressing of the data as it is being scanned by the video camera 350. The vertical line address is clocked into four-bit latches 505–513, which contain the complete memory address for the four lines of video data in the four input buffer registers 421–424. The output signals of the latches 505–513 are compared with the instantaneous disc memory address in the comparator circuits 514–521. The instantaneous disc memory address is the address of the recording heads on the disc surface. When a comparison is obtained between the memory address of the four input buffer registers with the instantaneous disc memory address, a clock signal is sent to the appropriate buffer register allowing transfer of the data from the registers to the disc.

Figure 14:
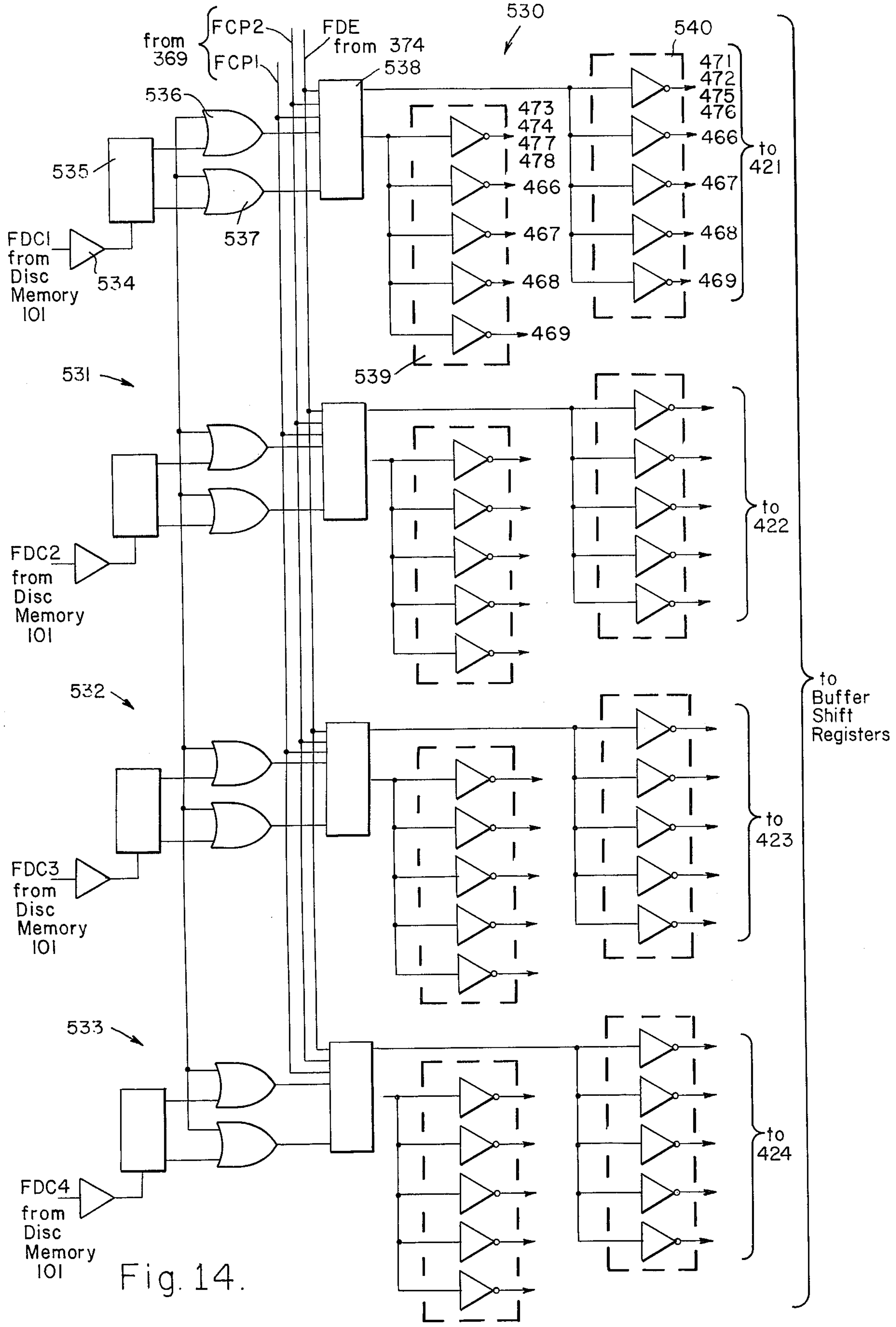
FIG. 14 is a schematic block diagram illustrating a buffer clock generator 376.

A buffer clock generator 376 is now described in detail in FIG. 14. The generator 376 includes four channels 530, 531, 532 and 533, each for generating two phase clock signals for controlling the input buffer unit 372. Only the first channel will be described in detail since the four channels are identical. The channel 530 includes an inverter 534, receiving an input signal from the disc memory 101 and the output terminal being coupled to a flip-flop 535. The flip-flop is in turn connected to two NOR gates 536 and 537. The output terminals of the NOR gates 536 and 537 are connected to the input terminals of a multiplexer 538. The multiplexer 538 also receives input control signals from the phase locked oscillator 369 and the buffer unload clock 374. The output terminals of the multiplexer 538 are connected to line driver networks 539 and 540 which are in turn coupled to the input buffer registers. Two input signals from the phase locked oscillator 369 are supplied to the multiplexer 538 for providing the proper output signals at the predetermined times.

The operation of the buffer clock generator 376 according to FIG. 14 is now described. Input signals from the disc memory 101 are provided to the flip-flop 535 through the inverter 534. A high frequency input clock signal is generated from a track on the disc 101. The input clock signals designated FDC1–FDC4 are for writing data onto the disc 101. The flip-flop 535 in conjunction with the NOR gates 536 and 537 provide the two input signals to the multiplexer 538 which are 180° out of phase. The signal FDE from the buffer unload 374 determines which set of clock signals FCP1 and two or output signals from 536 and 537 will be used to operate the shift registers 421–424. The output signals from the multiplexer 538 are provided to the input buffer unit 372 for writing the data in the shift registers and transferring the data therefrom. The control for the multiplex unit 537 is provided by two input clock signals, one from the sync separator 360 and one from the buffer unload clock 374. Data is written into the buffer registers 421, 422, 423 and 424 when the output signal from the sync separator 360 switches the multiplexer so that the input signals from the phase lock oscillator are provided to the line driver networks 539 and 540. Data from the buffer registers 421–424 is transferred into the disc memory in response to a signal from the buffer unload clock 374, which switches the multiplexer 538 such that the outputs of the NOR gate 537 and 538 are provided to the line driver networks 539 and 540. The switching of the multiplexer unit 538 is done in sync with the disc position to insure transfer of a full line of buffer data into a precise location on the disc.

The flip-flop 535 may be Model No. 74107 provided by Fairchild. The line driver networks 539 and 540 may be made of individual line drivers such as the Fairchild Model 9016. The multiplexer 538 may be a National Semiconductor part number 8233.

Figure 15:
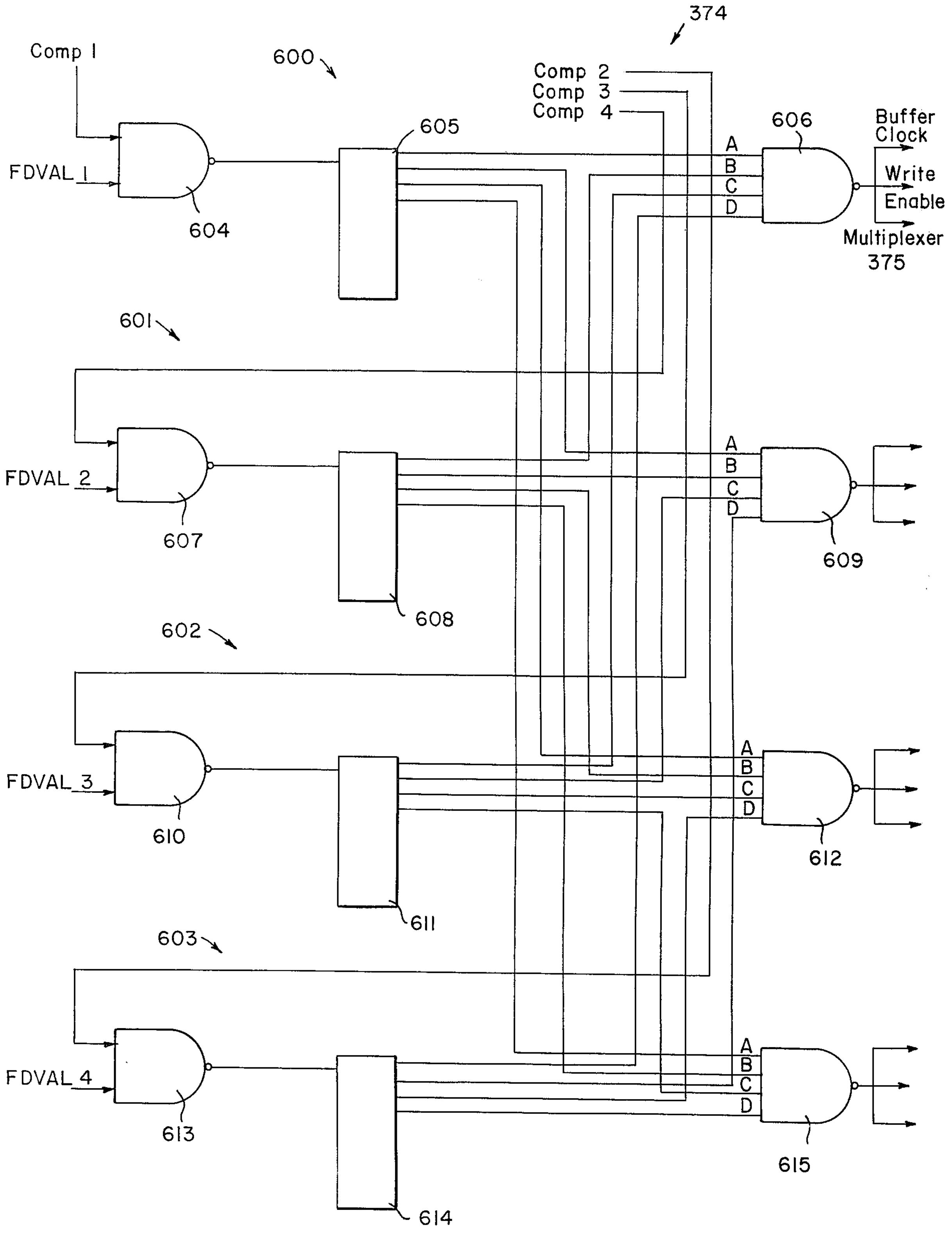
FIG. 15 is a schematic block diagram illustrating a buffer unload clock 374.

Referring more specifically to FIG. 15, a buffer unload circuit 374 is now described in detail. The buffer unload clock includes four channels, 600, 601, 602 and 603 for providing the proper unload signals to the buffer registers 421, 422, 423 and 424. The four channels are identical and therefore only the first channel 600 will be described in detail. The first channel 600 includes an AND gate 604 receiving a first signal from the comparator 393 and a full register signal from the sequential address counter 391. The counter 391 provides an output signal to the AND gate 604 whenever a full line of data has been received from the camera 350. The output terminal of the AND gate 604 is connected to the input terminal of a four-bit decoder 605. One output terminal of the decoder 605 is connected to one input terminal of OR gate 606. A second terminal of the decoder 605 is connected to a first terminal of an OR gate 610 in the second channel 610. A third output terminal of the decoder 605 is connected to a first terminal of an OR gate 613 in channel 602. A fourth terminal of the decoder 605 is connected to a first terminal of an OR gate 616 in the fourth channel 603. The OR gate 606 provides output signals to the buffer clock generator 376, the write enable generator 396, and the multiplexer 375. Channels 601, 602 and 603 are similarly connected as the channel 600. The decoders may be model 9301 manufactured by Fairchild.

The operation of the circuit according to FIG. 15 is now described. The buffer unload circuit 374 determines which tracks on the disc memory 101 are to receive the data being unloaded from the buffer registers 372. If an address comparison signal is received from the comparator 393 and a full register signal is received from the counter 391, the AND gate provides an output signal. The signal from the AND gate 604 enables the decoder which in turn enables the buffer clock write enable and multiplexer controls of the first beam. The second, third and fourth channels 601. 602 and 603 enable the second, third and fourth beams, respectively. The data in the buffer input registers 421–424 are switched to the transfer mode and a transfer clock signal is sent to the buffer clock generator 376. A write enable signal is also sent to the write enable generator 396 to switch the appropriate mode. tracks of the disc into the right mode.

Figure 16:
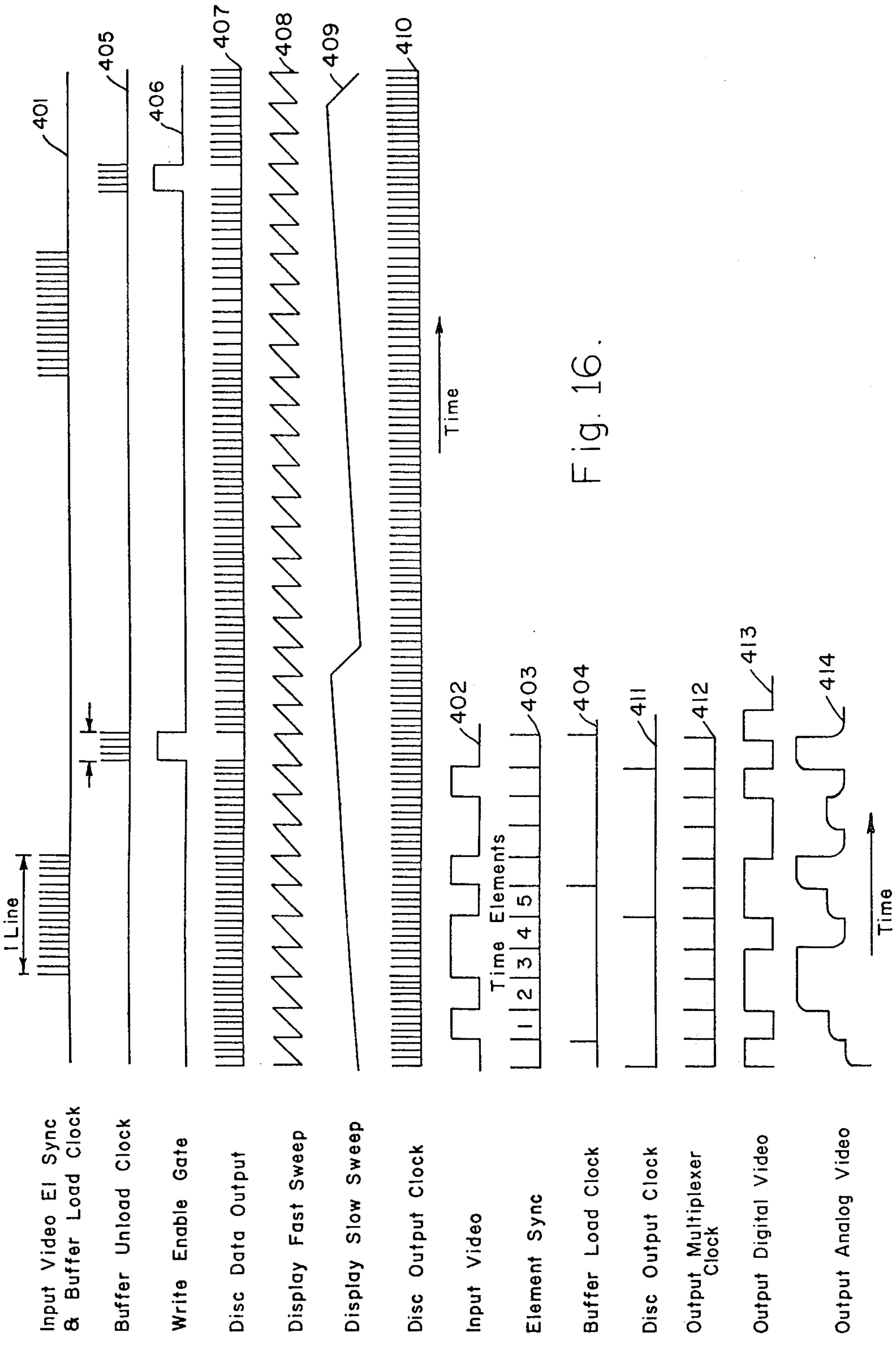
FIG. 16 is a schematic diagram of wave forms of voltages as a fuction of time for further explaining the operation of the scan converter of FIGS. 8*a* and 8*b*.

The input signal channel video including the element synchronizing signal on the lead 352 is shown in FIG. 16 by a waveform 401 as bursts of video, each representing a single line of video data. A portion of the input video on a different time scale is indicated by a waveform 402, and occurs on the leads at the output of the interface unit 370 (FIG. 8*a*). The element sync signal on the lead at the output of the phase locked oscillator 369, which shifts data into the commutator 371, which may be considered a relatively slow signal is shown by a waveform 403, and a buffer load clock signal from the clock generator 376 by waveform 404 as even a slower rate pulse for shifting the data out of the input line buffers. The buffer unload clock which transfers data to the disc memory is shown by a waveform 405 and provides a signal for each line period. In response to the write enable generator 396 a write enable gate of a waveform 406 enables the writing of the video into the disc memory 101. The disc data output as shown by waveform 407 and which represents the signal on the composite leads 378 to 381 is continuous except during the period of the write enable gate of the waveform 406. Thus, the disc memory is operated at the speed desired for the read-out. The display fast sweep is shown by waveform 408 and the display slow sweep signal is illustrated by the waveform 409. The disc output clock which operates at a relatively fast rate is illustrated by waveform 410 and is shown in more detail on a separate time scale as the clock of a waveform 411 which is utilized for loading the shift registers of the units 382 to 385 FIG. 8*b*. The output multiplexer clock for unloading the multiplexer shift registers is shown as a waveform 412 pulsing at a relatively high speed. The output digital video of a waveform 413 is applied to the D to A units to provide an output analog video of a waveform 414 at the input leads of the video amplifiers. As an illustrative example, the element sync signal of the waveform 403 may operate between 50 and 500 kilohertz depending on the input data rate, the output clock of the waveform 411 may operate at 3 MHz and the output multiplexer clock of the waveform 412 may operate at 15 MHz.

Thus, FIGS. 6, 8*a* and 8*b* illustrate a multibeam scan converter for converting a standard single channel video output signal into four parallel video channels as required for the display. The purpose for the 1 to 5 commutator is to reduce the video rates to one fifth their normal values so that the data rates are compatible with the disc storage system. After the 1 to 5 commutation each of the lines are split into four separate parallel channels corresponding to the four beams of the CRT for a total of 20 channels per intensity code level. These 20 channels are then recombined back into the basic four, as required to drive the display. In recombining the channels the video data rate is multiplied by 5. It has been noted that the principles of the invention are not to be limited to any particular serial parallel converter but that any suitable arrangement or source of parallel video data may be utilized.

It should be apparent from the foregoing that the present invention provides a high brightness and high resolution display system. Heretofore, single beam display systems require broadband video and deflection circuits which resulted in lower quality rasters displays, such as for example, poor brightness and resolution. The present invention provides a broadband operation by utilizing a plurality of narrow band channels for simultaneously generating a plurality of rasters.

Although the present invention has been shown and described with reference to particular embodiments, neverthe less, various changes and modifications obvious to one skilled in the art to which the invention pertains are deemed to be within the purview of the invention.

What is claimed is:

1. A display system having equalized line brightness comprising:

a source of sensor data having said data arranged in a predetermined number of N data lines:

display means for displaying a raster of data thereon having N display beams, positioned relative to said screen and relative to each other so that said N beams define N lines on said display means and form a raster of N lines by painting N lines at a time, said N beams being less than said N lines displayed on said display means:

data select means coupling said source of data to said display means for reading out selected lines of data N lines at a time beginning at a data second line to form a subsequent raster display on said display means;

scanning means coupled to said display means for simultaneously scanning said N beams across said display means in a first dimension;

deflecting means coupled to said data select means and to said display means for simultaneously deflecting said N beams in a second dimension for forming a raster by tracing N lines at a time: and said scanning means and said deflecting means paint a first raster commencing by tracing a first data line from said data select means at a first display line position on said display means by a display beam, and said scanning means paint a second raster commencing tracing a second data line from said select means at a second display line position by said first display beam.

2. A raster display system having equalized line brightness comprising:

a source of sensor data having said data arranged in a predetermined number of N data lines:

a cathode ray tube having a display screen for painting a raster of data thereon having N electron beams, and having control electrodes positioned relative to said screen and relative to each other so that said N beams define N lines on said screen and form a raster of N lines by painting N lines at a time, said N beams being less than said N lines displayed on said screen;

data select means coupling said source of data to said cathode ray tube for reading out selected lines of data N lines at a time beginning at a data second line to form a subsequent raster display on said screen;

scanning means coupled to said cathode ray tube for simultaneously scanning said N beams across said screen in a first dimension;

deflecting means coupled to said data select means and to said cathode ray tube for simultaneously deflecting said N beams in a second dimension for forming a raster by tracing N lines at a time; and said scanning means and said deflecting means paint a first raster commencing by tracing a first data line from said data select means at a first display line position said display screen by a first electron beam, and said scanning means paint a second raster commencing tracing a second data line from said data select means at a second display line position by said first electron beam.

3. A raster display system having equilized line brightness comprising:

a source of video data;

a cathode ray tube having an information display screen for writing a frame of data thereon having an electron gun providing N electron beams, said electron gun being positioned relative to said screen and having control electrodes positioned relative to each other so that said N beams define N lines on said screen and form a raster by painting N lines at a time, said N lines being a portion of the total lines to be displayed on said screen;

means coupling said source of data to said cathode ray tube for modulating said electron beams, said means being for providing parallel channels of video data and data beginning at a first line of stored data to form a first raster display on said screen and for reading out all the stored data beginning at a line other than said first line of stored data to form a subsequent raster display on said screen;

scanning means for simultaneously scanning said N beams across said screen in a first dimension;

deflecting means for simultaneously deflecting said N beams in a second dimension for forming a raster by tracing N lines at a time; and said scanning means and said deflecting means trace a first raster by tracing a first line of video data at a first line position on said display screen, and a second raster is formed by tracing a first line other than at said first line position.

4. The invention according to claim 3 wherein each raster being comprised of first and second fields and wherein:

each of said N beams are controlled by said deflecting means for scanning a first field by tracing a first set of alternate lines on said screen and for scanning said second field by tracing a second set of alternate lines on said screen.

5. The invention according to claim 3 wherein said control electrodes are for controlling a set of N beams and said cathode ray tube further comprises:

a second set of control electrodes for controlling a second set of N beams, said first set of N beams for scanning a first field, and said second set of N beams being for scanning a second field.

6. The invention according to claim 3 wherein said source of video data comprises:

N parallel video channels for providing N beams with narrow band signals.

7. A system for producing a broad band raster type display having lines of equalized brightness comprising:

a source of data for storing a predetermined number of data lines;

a cathode ray tube having a screen and a plurality of electrodes for producing a plurality of beams, each electrode beam positioned relative to said screen and relative to each other to define a paintbrush-like display on said screen;

beam switching means for providing selected ones of said stored data lines to said electron beams to display a first raster on said screen and for providing other selected ones of said stored data lines to said electron beams to display a second raster on said screen;

scanning means coupled to said cathode ray tube for controlling said plurality of beams to simultaneously scan such screen in the first dimension;

deflecting means coupled to said cathode ray tube for simultaneously deflecting said beams in a second dimension; and said scanning means in said deflecting means developing predetermined magnetic fields to control said beams to cause said plurality of beams to move across said screen in said first and second dimensions to form a plurality of lines on said screen for forming a first raster, and said deflecting means being for deflecting said beams from said first line position of said first raster and defining a second raster.

8. Invention according to claim 7 wherein said raster are comprised of first and second fields and wherein:

said deflecting means develop a magnetic field to control said plurality of beams to scan a first field on said screen by tracing a first set of alternate lines on said screen and to control said plurality of beams for scanning a second field on said screen by tracing a second set of alternate on said screen.

9. Invention according to claim 7 wherein said plurality of electrodes each produce a first plurality of beams and said cathode ray tube further comprises:

a second plurality of electrodes each for producing a second plurality of beams, each of said first plurality of beams for scanning a first field, and each of said second plurality of beams being for scanning a second field.

* * * * *